FIG. I

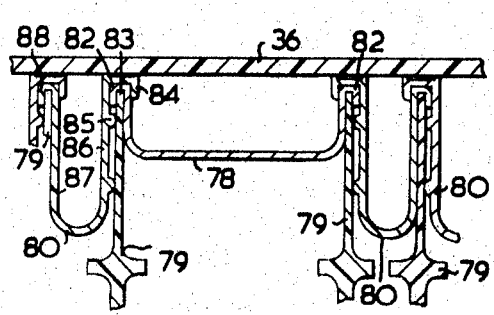
FIG.5
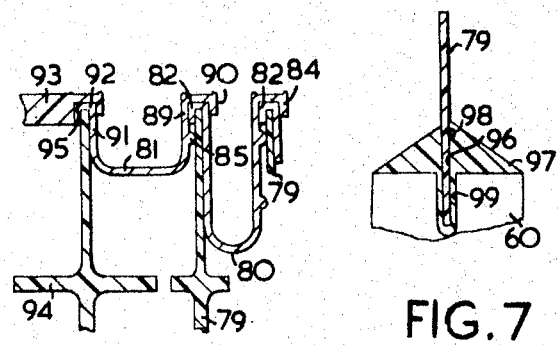
FIG.6
FIG.7
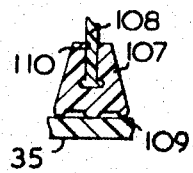
FIG.9
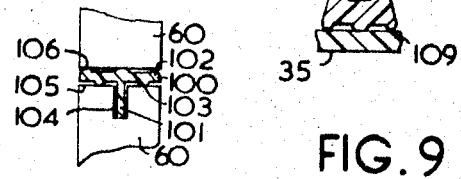
FIG.8

United States Patent Office 3,463,722
Patented Aug. 26, 1969

3,463,722
ELECTROLYSIS SYSTEM FOR CHLORATE MANUFACTURE
Göthe Oscar Westerlund, Vancouver, Canada, assignor to Chemech Engineering Ltd., Vancouver, British Columbia, Canada
Continuation-in-part of application Ser. No. 380,518, July 6, 1964. This application Apr. 18, 1966, Ser. No. 543,261
Claims priority, application Canada, July 3, 1964, 901,153
Int. Cl. B01k 3/00; C22d 1/02; C01b 11/26
U.S. Cl. 204—268
21 Claims

ABSTRACT OF THE DISCLOSURE

An improved electrolytic cell particularly adapted for the production of sodium chlorate. This cell includes a pair of bipolar electrodes, means for maintaining the cell full of electrolyte, means for removing gases and for effluent liquor and recirculation. There is also provided means for continuously introducing fresh electrolyte into the cell at a predetermined rate, with means within the container for the recirculation of electrolyte within the cell at a total rate which is greater than the predetermined rate, and in which the combined rates are sufficiently high to maintain any gaseous reaction products obtained during the electrolysis reaction within the electrolyte wtihin the container. The outlet means for removing a mixture of gaseous reaction products and electrolyte liquor from the cell has connected thereto means outside the container, for receiving that particular mixture of gaseous reaction products and effluent liquor in order to separate the gaseous products from the liquor. Means finally are provided for circulating a portion of that particular separated liquor back to the container.

---

This application is a continuation-in-part of application Ser. No. 380,518 filed July 6, 1964.

This invention relates to a bipolar electrolytic cell. It is particularly suitable for the production of metal chlorates, especilay alkali metal chlorates from sodium chloride brine. It relates also to the production of perchlorates from sodium chlorate solution, to the production of gaseous chlorine from hydrochloric acid solutions and (if the cell is modified to be a diaphragm cell) to the production of gaseous chlorine and gaseous hydrogen. It relates, more specifically, to an improved electrolytic cell and method of operating such cell. The present invention also relates to an improved electrolysis system and improved electrolysis process. The present invention also relates to novel means components for use in such cells.

Known electrolytic cells for the production of metal chlorates using consumable carbon electrodes have certain disadvantages. Monopolar cells inherently have many power connections and electrolyte branches, high electrode sub losses, high voltage drop and high power loss. Furthermore, many units are required in commercial production and much larger building spaces are required.

Bipolar electrolytic cells designed to avoid many of the above difficulties have brought about one major problem. Such cells are designed to operate with a gas phase above the level of the liquid and below the cell cover. The electrical connections to the graphite electrode is situated in this gas phase and accordingly, the danger of sparks occurring, with the resultant explosion is always present.

An object of one aspect of the present invention is the provision of a bipolar electrolytic cell in which the danger of spark-induced explosion is essentially avoided.

An object of another aspect of the present invention is the provision of a bipolar electrolytic cell in which electrode wear or disintegration is essentially uniform over the active surface of the electrodes.

An object of another aspect of the present invention is the provision of a bipolar electrolytic cell in which local overheating and differential rates of reaction are essentially minimized.

An object of yet another aspect of this invention is the provision of a bipolar electrolytic cell in which improved current efficiencies and minimized current leakage from cell to cell are attained.

An object of a still further aspect of the present invention is the provision of an improved electrolysis apparatus including a bipolar electrolytic cell.

An object of yet a further aspect of the present invention is the provision of an improved electrolysis procedure.

By one broad aspect of this invention, there is provided, in an electrolysis system including at least one cell provided by a pair of spaced apart monopolar electrodes and at least one bipolar electrode disposed therebetween to provide a plurality of electrolytic channels, container means receiving said cell and including a cover therefor, and means for maintaining said cell full of electrolyte, the improvement comprising: means for continuously introducing fresh electrolyte into said cell at a predetermined rate; outlet means for removing a mixture of gaseous reaction products and effluent liquor from said cell; means within said container for recirculation of electrolyte within said cell at a rate greater than said predetermined rate, said greater rate being sufficiently high to maintain said gaseous reaction products entrained in the electrolyte within said container; means outside of said cell connected to said outlet means for receiving a portion of the electrolyte flowing through said cell for separating gaseous products from said liquor; and means for circulating a portion of said separated liquor of reduced gas content back to said cell. By a preferred embodiment of this electrolysis system, the means for circulating a portion of said separated liquor of reduced gas content back to said cell includes: a closed loop system; and means for removing the remainder of said separated liquor from said closed loop system; wherein the amount of fresh electrolyte which is being introduced is substantially equal to the amount of said removed separated liquor. By a still preferred embodiment fo this system, the means for separating gaseous products from said liquor includes first means forming a primary separation unit, and second means forming a secondary separation unit, the first means preferably including a T-shaped member having two outlets, one outlet being connected to said second means, the other outlet being connected to a source of gaseous pressure.

By still another preferred feature of this aspect of this invention, the ratio of fresh electrolyte introduced into said cell and separated liquor flowing in said closed loop is between 1:100 to 1:3000. According to a still further feature of this aspect, the flow rate through said first means is less than said greater rate and the flow rate through said second means is less than that of said first means.

By yet another feature of this aspect, there is provided means giving a pressure differential across said first means between said cell and said second means. Also provided is a closed loop system including heat exchanger means interconnected between said cell and said second means, said heat exchanger being operative to reduce the temperature of liquor flowing therethrough by an amount not greater than 20° C.

According to another aspect of this invention an electrolytic cell is provided comprising: a cell box including a closure; monopolar electrode means and bipolar electrode means positioned in said box and constructed and arranged to conduct electric current through said box and through electrolyte circulating in electrolyte channels between said electrode means; main inlet means to said cell; means providing a primary inlet flow distributor; means providing flow from said primary inlet flow distributor to said electrolyte channels; means providing a primary recirculatory flow distributor spaced from said main flow distributor and interconecting said electrolyte channels and said primary inlet flow distributor; a primary outlet distributor; and a plurality of secondary outlet channels, each interconnecting an associated one of said electrolyte channels to said primary inlet distributor. In one preferred embodiment of this aspect the electrodes are positioned between said primary inlet flow distributor and said secondary outlet channels, while in another preferred embodiment transient storage means are provided between said main inlet means and said primary inlet flow distributor. In addition, by another aspect an inlet header is provided for the cell, the heading preferably being one which communicates with an upper, horizontally-disposed plate-like channel which, in turn, communicates with a lateral, vertically-disposed inlet conduit feeding a lower distributor connected to said electrolyte channels. In this aspect, by another preferred embodiment, the lower distributor comprises either a plurality of lower circulatory chambers, each connected to an associated one of said electrolyte channels or a lower distributor comprising a lower inlet manifold provided with a plurality of outlet slots, each slot leading to an associated one of said electrolyte channels.

By another embodiment of this aspect of the present invention, the means providing a primary recirculatory flow distributor comprises a lateral, vertically disposed channel interconnecting the upper portion of said electrolyte channels with said means providing a primary inlet flow distributor.

By yet another embodiment of this aspect, the means providing a primary recirculatory flow distributor comprises an upper chamber superposed on each said electrolytic channel, said chamber communicating, via a restricted aperture, with a vertically extending lateral channel, said lateral channel, in turn, communicating, via a restricted aperture, with a lower manifold, said manifold being provided with a plurality of slotted outlets, each slotted outlet communicating with an associated one of such electrolyte channels.

By another embodiment of this aspect, the primary outlet means comprises an upper, horizontally-disposed, plate-like chamber, said chamber being connected, at its inlet, to the upper portions of each such electrolytic cell, and being connected, at its outlet, to an outlet header while in still another embodiment the secondary outlet channels comprise a plurality of divider conduits, each said conduit communicating, at its lower portion, with the upper portion of an associated one of said electrolyte cells, and communicating, at its upper, remote portion, with said primary outlet distributor.

By another aspect of this invention a component is provided for an electrolytic cell, said component being formed of an electrically non-conductive material, said component comprising: a hollow conduit; a non-porous divider plate depending therefrom; means providing an inlet situated in a bottom surface of said conduit and disposed solely to a selected side of said plate; means providing an outlet situated in an upper surface of said conduit diametricaly opposed from said inlet means; a first transversely extending non-porous plate disposed at one end of said depending plate adjacent said outlet means and a second transversely extending non-porous plate disposed at the opposite end of said depending plate; means forming a restricted outlet in the second said transversely extending plate on the same selected side of said depending plate as said outlet; and means providing an outlet from said hollow conduit, situated in the upper surface of said conduit diametrically opposed to said bottom inlet means.

By still another aspect of this invention a circulatory system of components is provided for an electrolytic cell including at least two electrolyte channels, said system comprising: a vertically extending inlet conduit; an inlet manifold; means providing a restricted inlet between said inlet conduit and said inlet manifold; means providing an outlet from said manifold communicating directly with said electrolyte channels; a recirculatory conduit positioned to receive flow from each electrolyte channel for returning liquor to said manifold; means providing an inlet to said recirculatory channel from each said electrolyte channel; means providing a restricted inlet between said recirculatory channel and said manifold; a hollow conduit capping said electrolytic chamber, said conduit including a non-porous divider plate depending therefrom; means providing an inlet situated in a bottom surface of said conduit and disposed solely to a selected side of said plate; means providing an outlet situated in an upper surface of said conduit diametrically opposed from said inlet means; a first transversely extending non-porous plate disopsed at one end of said depending plate adjacent said outlet means and a second transversely extending non-porous plate disposed at the opposite end of said depending plate; means forming a restricted outlet in the second said transversely extending plate on the same selected side of said depending plate as said outlet; and means providing an outlet from said hollow conduit, situated in the upper surface of said conduit diametrically opposed to said bottom inlet means; said inlet means on the bottom surface of said conduit providing outlet means from each said electrolyte channel to said hollow conduit.

By a still further aspect of this invention there is provided, in combination, a monopolar electrode for an electrolytic cell and a connector connected thereto, said connector comprising a core of electrically conducting metal; a sheath surrounding said core, said sheath being of electrically conducting chemically resistant metal; and a plating of platinum over a selected portion of the circumference of said sheath; said connector being connected to said monopolar electrode via said platinum surface, and said platinum plating being in electrical contact with said electrode along substantially the entire surface thereof.

By a still further aspect of this invention an electrolysis system is provided comprising: an enclosed bipolar electrolytic cell provided with inlet and oulet means to maintain said cell full of electrolyte; means associated with said outlet means providing at least a partial separation of entrained gaseous products of electrolysis from the effluent liquor; vent means for said gases; means conducting said effluent liquor to a reacting and degassifying chamber; gaseous vent means associated with said reacting and degassifying chamber; means for conducting that preponderant amount of the effluent from said reacting and degassifying chamber which is to be recycled to heat exchanger means; means conducting that effluent from said heat exchanger means which is to be recycled to a header tank and reacting chamber; means conducting effluent from said header tank and reacting chamber together with fresh electrolyte to said enclosed bipolar electrolytic cell; and means withdrawing a minor amount of the effluent from the degassifier from the system.

By another aspect of this invention there is provided, in an electrolysis system including an electrolytic cell: a degassifying chamber, a reacting chamber and a heat exchanger and means interconnecting said three components together to provide control of the temperature of effluent from said reacting chamber which is to be recycled to said electrolytic cell.

By a further aspect of this invention, a method is provided for conducting an electrolytic reaction in a cell substantially full of electrolyte comprising: feeding a relatively large volume of electrolyte through said electrolytic cell; recirculating a major proportion of said electrolyte including entrained gaseous products of electrolysis in a non-electrolytic zone to be refed to said cell; withdrawing a portion of effluent liquor including entrained gaseous products of electrolysis from said cell; separating said gaseous products from said effluent liquor; and refeeding said liquor to said electrolysis zone.

By yet another aspect of this invention, an electrolysis procedure is provided comprising: effecting an electrolysis reaction of an aqueous solution of a metal halide; effecting a partial separation of the liquid products of said electrolysis from entrained gaseous products of said electrolysis; effecting a degassification and reaction between primary products of said electrolysis; adjusting the temperature of the products of reaction; effecting a further reaction of said products of reaction whereby to form chlorate ions; and recycling said reaction products for further electrolysis reaction.

By a still further aspect of this invention there is provided, in a method of operating a bipolar electrolytic cell in which the bipolar electrodes are consumed during the electrolysis reaction and in which electrolyte is circulated in contact with said electrodes; the steps of periodically measuring the voltage at a standard temperature to provide a relationship between the increase in voltage and the amount of electrode consumed, and discontinuing the electrolysis reaction when a discontinuity in said relationship is observed.

The present invention, thus, is concerned in one of its aspects with the well-known procedure for the production of metal chlorates, particularly alkali metal chlorates although it can be used for the production of perchlorates and hypochlorites. It is well-known that alkali metal chlorates may be prepared by electrolysis of an aqueous solution of an alkali metal chloride. In this process elemental chlorine is evolved at the anode and alkali metal hydroxide at the cathode. However, in the cells, according to one aspect of this invention, since there is no diaphragm between the cathode and the anode, the primary products of the electrolysis react to form the alkali metal chlorate. However, the present invention embraces uses in chlorine-alkaline cells, electrolysis of hydrogen chloride for the production of hydrogen and chlorine, and/or the electrolysis of water to produce hydrogen and oxygen.

The simplified reaction in the aforesaid alkali metal chlorate electrolysis may be summarized as:

$$MtCl + 3H_2O + 6 \text{ Faradays, } MtClO_3 + 3H_2$$

wherein $Mt$ is a metal. The main reactions in the electrolytic preparation of the metal chlorate from the metal chloride may be represented as follows:

PRIMARY REACTIONS (A) At the anode (1)     $2MtCL \rightleftharpoons 2Mt^+ + 2Cl^- \rightarrow Cl_2 + 2e^- + 2Na^+$ (B) At the cathode (2)     $2H_2O \rightleftharpoons 2H^+ + 2OH^- + 2e^- \rightarrow H_2 + 2OH^-$

SECONDARY REACTIONS (C)     $Cl_2 + OH^- \rightarrow ClOH + Cl^-$     (3)
           $ClOH \rightleftharpoons H^+ + OCl^-$     (4)

(D)     $2ClOH + ClO^- \rightarrow ClO_3^- + 2Cl^-$     (5)

UNDESIRABLE SIDE REACTIONS (E) Oxidation at the anode (6)     $HClO + H_2O \rightarrow O_2 + 3H^+ + Cl^- + 2e^-$
(7)     $2H_2O \rightarrow O_2 + 4H^+ + 4e^-$ (F) Reduction at the cathode (8)     $ClO^- + H_2O + 2e^- \rightarrow Cl^- + 2OH^-$
(9)     $ClO_3^- + 3H_2O + 6e^- \rightarrow Cl^- + 6OH^-$ (G) Hypochlorite attack by nascent hydrogen

(10)     $ClO^- + 2H \rightarrow H_2O + Cl^-$ (H) Breakdown reactions in sunlight

(11)     $2HClO \rightarrow 2HCl + O_2$
(12)     $HClO + HCl \rightarrow H_2O + Cl_2$ (I) Breakdown reaction in the presence of catalysts

(13)     $2MtClO \rightarrow 2MtCl + O_2$ (J) Breakdown due to vapor pressure

(14)     $Cl_2 \text{ (in solution)} \rightarrow Cl_2 \text{ (gaseous)}$

It is manifest that conditions within the electrolysis system in general and in the electrolytic cell in particular should be carefully controlled in order to obtain the optimum desired final product and to obtain a high current efficiency.

The present invention provides means for separating entrained gases of the electrolysis reaction from the outgoing liquor and recycling the gas-free liquor back to the cell. One preferred way of achieving this end is to provide a primary gas separation unit and a secondary gas separation unit. The primary gas separation unit may be in the form of a T-shaped member having an inlet connected to the cell outlet but outside of the cell itself. The T has two outlets, one of which is connected to a source of gaseous pressure, the other of which is connected to the secondary gas separation unit.

It is preferred that the source of gaseous pressure be a negative pressure. This can be achieved either by the step of drawing away the liberated gases or by the use of a pressure drop leg (in the connection to the secondary gas separation unit) which inherently provides such negative pressure. This provides an important feature of the present invention in that it prevents the electrolyte from proceeding directly to the cell. It is desirable to proceed in this manner in order to prevent high current leakage. This is provided by a hanging distribution channel for the inlet of fresh electrolyte to the cell and for the outlet of the products of the electrolysis.

In addition, the cell is specifically and expressly filled with the electrolyte. Operation of the cell should be carried out at a high velocity throughput so that the gaseous products of the electrolysis is retained in the electrolyte as finely divided bubbles. The high velocity is dependent upon various factors, but usually is between 2 and 100 feet per minute. Thus, if the electrodes are graphite, the velocity should not exceed 50 feet per minute. On the other hand, if the electrodes are platinized titanium, a greater velocity can be tolerated, up to 100 feet per minute. A preferred rate is 10 feet per minute. The high velocity not only maintains the gaseous products of the electrolysis entrained in the electrolyte, but also mixes the fresh electrolyte with the recirculating electrolyte. In this way the temperature within the cell is maintained substantially uniform. This, in turn, minimizes uneven electrode consumption. Such liquor with the gas bubbles entrained therein is permitted to enter the small confined space of the primary separation unit as previously described where the gas bubbles separate. As regard to this small confined space, the cross-sectional area should be slightly larger than necessary in order to prevent foaming when the gas escapes. By means of the primary gas separation unit and the secondary gas separation unit, the high velocity outlet liquor is decreased in velocity, usually to less than 2 feet per minute. Preferably the velocity through the primary separation unit, which is less than 2 feet per minute is less than the velocity through the cell, but is greater than the velocity through the secondary gas separation unit. By these means, the amount of gas entrained in the recirculating liquor is usually less than 1%. In addition, the gaseous products of the electrolysis reaction may now be removed from the system at a controlled location.

Another advantage of the removal of the gaseous products of electrolysis is that the reaction rate of the production of chlorate from the hypochlorite produced in the cell is increased in a substantially gas-free zone. Thus, the removal of the entrained gases improves the efficiency of the chlorate formation.

As noted above, it is important to provide a high circulation rate in the cell. In addition, such high rate minimizes local high concentrations of hypochlorite formed in the electrolysis reaction which both decomposes to chlorides (see Equation 8) and also consumes the graphite. The use of the inherent internal circulation alone by means of an external circulation tank is unsatisfactory while the use of an external pump alone involves high capital cost and high cost of power for driving the pumps. This aspect of the present invention combines enforced external pumping action with the natural pumping action due to rising gases, coupled with the directed internal circulation due to the particular construction and arrangement of the bipolar electrodes and the distributor. Another important consequence of such natural pumping action is that it is self compensating. In one example, as the current density of the current performing the electrolysis increases, the internal circulation increases. This is due to the fact that the amount of gaseous products of electrolysis increases with increasing current density. Then, assuming the spacing between the bipolar electrodes to remain constant, the specific gravity of the electrolyte is less, causing it to rise faster. The rate of internal circulation, therefore, is due to the natural buoyancy of entrained gaseous products of electrolysis and the difference in specific gravity of the electrolyte in the interelectrode zone and in other zones.

In another example, as the bipolar electrodes are consumed, the internal circulation automatically decreases. This is due to the fact that the space between the bipolar electrodes is increased. Consequently the above noted difference in specific gravity is not as great. Thus, as the electrodes are consumed, the internal circulation rate decreases. Since the erosion of the electrodes, as distinct from the consumption of the electrodes is dependent, to some extent, on the rate of circulation, the length of life of the cell tends to be increased because of the self-regulation effect of decreasing the rate of circulation as the bipolar electrode is consumed. The minimum internal rate of circulation depends upon the minimum current density required for selected cell parameters, coupled with the maximum interelectrode space and the forced external circulation.

In another aspect of this invention advantage is taken of the fact that as the bipolar electrodes are consumed, the voltage increases, assuming the current density, and the temperature remains constant. This is due to the fact that, the construction and arrangement of bipolar electrodes is such that the current travels across the thickness of the bipolar electrode. Thus, as the thickness of the electrode decreases, and since the current density is constant, the voltage increases. Since the voltage is dependent on temperature, the temperature should be maintained constant. Consequently, if a plate is made of the voltage, at constant current and temperature, as the thickness of the electrode decreases, the voltage increases. As the electrodes are more and more consumed, the voltage increases. When at least one of the electrodes is completely consumed at one or more locations, i.e., when a "hole" is eroded through an electrode, the voltage drops suddenly, since the number of electrolyte channels is decreased. Consequently, at this instant, maximum utilization of the bipolar electrodes is achieved, and the electrodes in the cell may be replaced by fresh electrodes.

It is important to provide seals throughout the cell in order to provide improved circulation as previously noted. This result in uniform electrode wear or disintegration. Spalling of the bipolar electrodes and uneven wear are minimized and, as a result, local overheating and different rates or reaction are minimized. Improved current efficiencies are attained by equalizing electrolyte composition, pH and temperature throughout the cell. Harmful and undesirable side reactions are reduced and positively controlled. The seals used as cell dividers reduce current leakage from cell to cell. The actual construction of practical embodiments of the seals and dividers will be described hereinafter.

The power connectors to the monopolar should have a core of a high conductivity metal in order to minimize power losses. A suitable metal for the connector is titanium. In addition, the possibility of having poor contacts between the connector and the monopolar electrode is minimized by the fact that the platinized coatings are resistant to oxidation and reaction with the cell liquor. Using this type of connectors, cell gas explosions which might occur when the electrodes extend through the gas zone due to electrical sparks at the liquor surface and/or cover are, of course, eliminated. Thus, the current connection to the monopolar electrodes are in the liquor phase rather than in the gas phase. If the connections are in the gas phase, i.e., if they are exposed, a higher potential results and there is more danger of current leakage. If any discontinuity should develop in the salt bridge which usually is formed near the top of the conventional cells, the risk of sparking and subsequent explosions is present.

It is also a feature of this invention that uniform contact is maintained between the current connector and the monopolar electrode. Where the monopolar electrode is graphite, the upper surface is shaped to conform to the contacting shape of the current connector. In order to assume uniform contact, a high conductive paste is placed between the two electrode members, and when the paste hardens, substantially no free space remains between such members.

Mention has been made heretofore of the current density. The current density is dependent upon the interelectrode space, i.e., the spacing, in that part of the electrolyte channel where two bipolar electrodes face one another, and the flow rate in such electrolyte channel. Basically at a flow rate of 2 feet per minute. A current density of 0.3 amp/in.$^2$ is suitable. At a flow rate of 100 feet per minute a current density of 1.5 amp/in.$^2$ may be used. At slow rates of the order of 10 feet per minute current densities of 0.48 amp/in.$^2$ or 0.58 amp/in.$^2$ or 0.9–1.0 amp/in.$^2$ are satisfactory.

The interelectrode space depends to some extent on the material out of which the electrodes are formed. For graphite electrodes, whose thickness (at start up) is ¾ inch, a spacing (at start up) of ⅛ inch to one inch is satisfactory. For very thin platinized titanium, on the other hand, the spacing (at start up) would be ⅛ inch to ⅝ inch. With the parameter selected as above noted, the life of the electrodes is approximately 18 months.

As noted hereinabove, the temperature is critical for optimum results. As the temperature increases, the consumption of electrodes increases. For graphite electrodes, consumption (by the reaction $C+O_2(\text{in ClO}^-)\rightarrow CO_2$) is approximately twice as fast at 50° C. than at 40° C. Consequently for graphite electrodes, the temperature should be between 30° C. and 50° C.

Platinized titanium electrodes, on the other hand are more resistant. Since at higher temperatures the voltage may be increased (because the electrical resistance of the electrolyte increases with lower temperatures), thereby increasing the reaction speed while decreasing the reaction volume, a temperature of 40–95° C. may be used with such electrodes. A temperature of 60° C. is optimum.

In order to maintain a desired temperature within the cell, and because the electrolysis reaction is somewhat exothermic, the temperature of fresh electrolyte and recirculating liquor is usually lower than the temperature to be maintained in the cell. This temperature is dependent on the recycle rate, i.e., the ratio between the volume of liquor circulated in the closed loop and the volume withdrawn therefrom. Where the rate is 100:1, the temperature is 20° C. lower than the cell reaction temperature desired. Where the rate is 3000:1, the temperature Where the rate is 1000:1, the temperature is 20° C. less. Of course, the volume of the liquor withdrawn from the closed loop depresents the production of final product, preferably chlorate.

The present invention includes other aspects which embody one or more of the following desirable embodiments:

The system as previously described wherein a current density of between 0.3 to 1.5 amps per square inch of electrode surface is applied to each of said electrodes and wherein the action of said applied current density co-operates with said means within said container for recirculating said electrolyte.

Such a system wherein said electrodes are graphite and wherein said greater rate is between 2 and 50 feet per minute.

Such a system wherein the flow rate through said first means is less than said greater rate and the flow rate through said second means is less than that of said first means.

Such a system wherein said electrolyte is sodium chloride brine having a pH of between 5.0 and 7.1 and wherein the primary component of said gaseous reaction products is hydrogen gas.

Such a system including means for maintaining the electrolyte in said cell at a temperature of between 30° C. and 95° C.

Such a system wherein the electrodes are graphite electrodes and temperature is in the range of 30° C. to 50° C.

Such a system wherein the electrolytic space is between ⅛ inch to 1 inch.

Such a system wherein the power applied to said electrodes for the production of one pound of sodium chlorite is not greater than 785 ampere hours.

Such a system wherein said electrolyte is sodium chloride brine having a pH of 5.0 and 7.1, said gaseous reaction products including hydrogen gas as a primary component, and including a reaction chamber positioned to receive flow from said heat exchanger for converting sodium hypochlorite to sodium chlorate, and means connected to said reaction chamber to introduce liquor of increased sodium chlorate content into said cell.

Such a system is which said ratio is 1:1000 and including heat exchanger means operative to reduce the temperature of liquor flowing therethrough and back to said cell by an amount of 2° F.

Such a system wherein the flow rate through said T-shaped member is less than 2 feet per minute.

Such a system wherein the electrical connections to said monopolar electrodes are immersed in said electrolyte.

Such a system wherein a current density of between 0.3 to 1.5 amps per square inch of electrode surface is applied to each of said electrodes and wherein the action of said applied current density co-operates with said means within said container for recirculating said electrolyte.

The electrolytic cell as previously described wherein said bipolar electrode means comprises a plurality of bipolar electrodes.

Such a cell wherein each such bipolar electrode comprises a stack of a plurality of electrode members.

Such a cell wherein said stack of electrode members is slidably retained between electrically non-conductive channel members.

Such a cell wherein there is provided a plurality of such electrolyte channels arranged in seriatim side-by-side relationship, and wherein there is provided one monopolar electrode between every adjacent such electrolyte channel.

Such a cell wherein the bipolar electrodes are horizontally-disposed, longitudinally extending graphite plates.

Such a cell provided with means spacing said electrodes from the bottom of said box and from said closure; and current leakage preventing fluid-tight seals disposed (a) between said closure and said spacing means, (b) between said spacing means and an upper electrode of said group of electrodes, (c) between adjacent electrodes in said group of electrodes, (d) between a lower electrode of said groups of electrodes and said spacing means, and (e) between said spacing means and said bottom.

Such a cell wherein said immersed electrical connections are provided by platinized titanium electrodes connected directly to said monopolar electrodes.

A component from electrolytic cell as previously described wherein said hollow conduit is rectangular in cross-section.

Such a component wherein said inlet means and said outlet means are slot-like.

Such a component formed of polyvinyl chloride.

Such a component in the enviroment of a circulatory system for a cell including at least two electrolyte channels, said system comprising: a vertically extending inlet conduit; and inlet manifold; means providing a restricted inlet between said inlet conduit and said inlet manifold; means providing an outlet from said manifold communicating directly with said electrolyte channels; a recirculatory conduit positioned to receive flow from each electrolyte channel for returning liquor to said manifold; means providing an inlet to said recirculatory channel from each said electrolyte channel; means providing a restricted inlet between said recirculatory channel and said manifold; a hollow conduit capping said electrolytic chamber, said conduit including a nonporous divider plate depending therefrom; means providing an inlet situated in a bottom surface of said conduit and disposed solely to a selected side of said plate; means providing an outlet situated in an upper surface of said conduit diametrically opposed from said inlet means; a first transversely extending non-porous plate disposed at one end of said depending plate adjacent said outlet means and a second transversely extending non-porous plate disposed at the opposite end of said depending plate; means forming a restricted outlet in the second said transversely extending plate on the same selected side of said depending plate as said outlet; and means providing an outlet from said hollow conduit, situated in the upper surface to said conduit diametrically opposed to said bottom inlet means; said inlet means on the bottom surface of said conduit providing outlet means from each said electrolyte channel to said hollow conduit.

Such a system wherein said manifold is provided with an enlarged area slot to communicate with the bottom portion of said electrolytic chamber; wherein said inlet to said recirculatory channel is near the top of said electrolytic chamber; wherein the outlet from said electrolytic chamber to said hollow conduit is remote from said inlet to said recirculatory channel and wherein said outlet from said hollow conduit is remote from its inlet.

The electrode combination as previously described wherein an electrically conductive paste is disposed between said platinum and said electrode to provide said uniform electrical contact.

Such a combination in which the core is formed of copper and/or the sheath is formed of titanium.

Such a combination wherein the monopolar electrode comprises a plurality of adjacent, touching vertically extending graphite electrodes.

An electrolysis system as previously described including: a branch line from said reacting and degassifying chamber to a filter; conduit means from said filter; and storage means for effluent from said filter.

A method for conducting an electrolytic reaction as previously described wherein said electrolyte is fed upwardly through said cell and wherein said recirculating is effected downwardly.

Such a method including the step of first feeding said electrolyte downwardly in a non-electrolysis zone.

Such a method wherein said upwardly moving electrolyte is moving upwardly at a speed of 2–100 feet per minute.

Such a method wherein said upwardly moving electrolyte is moving upwardly at a speed of 2–50 feet per minute assisted by upward movement of entrained gaseous products of said electrolysis.

Such a method including adding fresh electrolyte to the system.

An electrolysis procedure as previously described wherein the temperature of said electrolysis reaction is from 30–95° C.

Such a procedure wherein the temperature of said electrolysis reacion is 30–50° C.

Such a procedure wherein the pH of said electrolyte being electrolysed is 5.0–7.1.

Such a procedure wherein the current density for the electrolysis reaction is 0.3–1.5 amp/in.$^2$.

Such a procedure wherein the current efficiency is 88%, basis of 687 amp/hrs. to produce one pound chlorate equals 100%.

Such a procedure wherein the temperature of the products of reaction is reduced by from 2–20° C. lower than the temperature of said electrolysis reaction.

Such a procedure including the steps of withdrawing and storing a minor proportion of said chlorate reaction products, and wherein the proportion of chlorate reaction products stored is from 1:100 to 1:3000.

The method of operating a bipolar electrolytic cell as previously described wherein the rate of circulation is automatically decreased as the electrodes are consumed.

Such a method wherein the rate of circulation is automatically increased as the current density for the electrolytic reaction increases.

In the accompanying drawings,

FIGURE 5 is a central longitudinal cross-section of a series of top fluid tight seals and dividers according to an aspect of the present invention;

FIGURE 6 is a central longitudinal cross-section of a further series of top fluid tight seals and dividers according to another aspect of the present invention;

FIGURE 7 is a central longitudinal cross-section of a typical fluid tight seal between a divider and an upper electrode;

FIGURE 8 is a central longitudinal cross-section of a typical fluid tight seal between adjacent electrodes;

FIGURE 9 is a central longitudinal cross-section of a typical fluid tight seal between the bottom of the cell and a lower divider;

Figure 1:
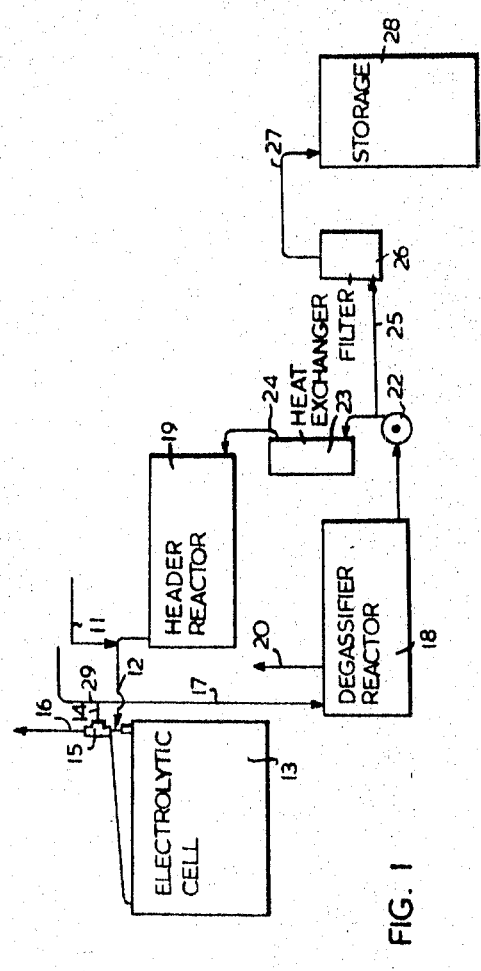
FIGURE 1 is a schematic flow diagram of the process and apparatus of one embodiment of the present invention.

Referring to FIGURE 1, electrolyte, consisting of fresh electrolyte from line 11 and recycled liquor from line 12 enters the electrolytic cell 13 through inlet header 14. Electrolysis proceeds, and effluent liquor, consisting of $Cl_2$, $Na^+$, $H_2$, $OH^-$, $ClOH$, $Cl^-$, $H^+$, and $OCl^-$ leaves via outlet header to T-separator 15. Entrained gases permitted to separate in T-separator 15 and which consist of $H_2$, $H_2O$ (vapor), $O_2$, $CO_2$ and $Cl_2$, leave via vent line 16. The effluent liquor passes from T-separator 15 via line 17 to degassifier-reactor 18.

The cross-sectional area of the degassifier-reactor 18 is specifically designed and is of such a size that the liquor velocity is reduced to such an extent that optimum separation of the entrained gases takes place while minimizing foaming and substantially reducing short circuiting through the tank, which would result from too low a liquor velocity. The velocity, on the other hand, must be sufficient to utilize the entire vessel but should not be too rapid to inhibit the expulsion of the entrained gases. The optimum velocity is a function of the apparent density of the liquor, which, in turn, is dependent on the amount of entrained gases and the bubble size. It has been found that a liquor velocity of less than 2 ft./min. can separate more than 95% and even as great as 99% of the entrapped gases.

The degassifier-reactor 18 also is for the purpose of permitting the reaction.

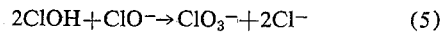

$$2ClOH + ClO^- \rightarrow ClO_3^- + 2Cl^- \qquad (5)$$

to take place. For any selected temperature, the retention time in the degassifier-reactor 18 is a function of the concentration of $ClOH$ and $ClO^-$ present in the liquor which in turn is directly related to the current density. Thus, it was found that to yield a current efficiency of greater than 88%, with a constant recirculation of liquor and a pH of 6.5, the current density should be less than 4.5 amps/litre at 50° C. or less than 3 amps/litre at 35° C. The current density (in amps/litre) is the main determining factor in calculating the reacting chamber volume. The retention time on the other hand, is dependent on the rate of the liquor circulation, as well as on the volume of the reaction vessel. The rate of liquor circulation is between 2 feet per minute and 100 feet per minute, usually below 50 feet per minute and desirably 10 feet per minute. At these rates the current density ranges from 0.3 amps/in.$^2$ to 1.5 amp/in.$^2$ respectively. Useful values are 0.48 amp/in.$^2$, 0.58 amp/in.$^2$ and 0.9–1.0 amp/in.$^2$. For convenience, the reaction vessel is divided into two vessels, i.e. degassifier-reactor 18 and header-reactor 19, which will be described hereinafter.

The particular arrangement of the degassifier-reactor 18 enables it to be used as a liquor seal for the cell gases carried off through line 16. In addition, the degassifier-reactor 18 is provided with a vent line 20 where gases have been released from the liquor. These gases are combined with the gases in line 16 and may be vented as waste, or may be oxidized, as will be described hereinafter. In addition, there is a pressure differential across T-separator 15 between electrolytic cell 13 and degassifier-reactor 18. This is, in fact, inherently accomplished by line 17 which provides a drop leg. Alternating vent line 16 may be connected to a source of negative pressure.

The liquor entering the degassifier-reactor 18, in a preferred embodiment, has a temperature of about 45° C. As a result of the reaction therein, the effluent liquor has a temperature of about 45.5 C. The effluent liquor passes via line 21 to pump 22 to the heat exchanger 23 where it is again cooled to about 45° C. The pump provides the enforced circulation to overcome the drag of the heat exchanger. The effluent from the heat exchanger 23 passes via line 24 to the header-reactor 19. Since the electrical resistance of the electrolyte increases with decreasing temperatures, it is desirable to operate the cell at higher temperatures. On the other hand, the consumption of graphite electrodes increases with increasing temperature. To strike a balance between these two opposing factors, temperatures of 30° C. to 50° C. are used.

Header-reactor 19 is a second reacting chamber where Equation 5 takes place. Care is taken to avoid short-circuiting and channelling to maintain a constant reaction or retention time. It is important to control precisely the temperture in header-reactor 19. The higher the temperature, the lower the volume of the header-reactor 19, with its attendant upsetting of the retention time. A longer retention time favors the desirable reaction

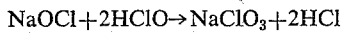

$$NaOCl + 2HClO \rightarrow NaClO_3 + 2HCl$$

It is also important to minimize the concentration of the hpyochlorite for if it is too high it will decompose, as shown in Equation 8.

Furthermore, it is important to operate the reaction in an essentially gas-free environment, since the speed of such reaction is thereby increased.

In addition, the pH must be less than 7 and preferably between about 5 and 7. At a pH of 6.8, the optimum reaction of two moles of HClO to 1 mole of NaOCl takes place.

It is also noted that the header-reactor 19 serves, in addition to being a reaction vessel, as a header and pipeline for the recycle of the liquor.

From header-reactor 19, the liquor proceeds via line 12 to the cell 13.

A branch line 25 leads from degassifier-reactor 18 to a filter 26, where particles of graphite are filtered out, and then through line 27 to a chlorate storage tank 28. It is preferred that a recycle rate of from 3000:1 to 100:1 take place preferably from 1000:1 to 200:1, most desirably from 500:1 to 200:1, i.e. 500 to 200 parts recycled liquor for each part of chlorate-containing liquor to storage. The recycle rate is interrelated to the temperature of the liquor returning to cell 13 via line 12. When the rate is 3000:1, the temperature in line 12 is less than one centigrade degree below the temperature in cell 13. On the other hand, at a recycle rate of 100:1 the temperature in line 12 is 20° C. lower than that in cell 13. At a recycle rate of 1000:1, the temperature in line 12 is 2° C. less than that in cell 13.

It is also to be observed that the flow rate through cell 13, which is from 2 feet per minute to 100 feet per minute, is greater than the flow rate through T-separator 15, which, in turn has a flow rate greater than that through degassifier-reactor 18.

If it is desired to oxidize the gases from line 16 and 20, it is noted that the gases have the following ranges of proportions:

| | Percent by volume |
|---|---|
| Hydrogen, $H_2$ | 89–94 |
| Water vapor, $H_2O$ | 3–6 |
| Oxygen, $O_2$ | 2–4 |
| Carbon dioxide, $CO_2$ | 0.3–0.6 |
| Chlorine, $Cl_2$ | 0.2–1 |

In combusting the gases the following reaction will take place: $H_2 + Cl_2 \rightarrow 2HCl$ (producing hydrogen chloride), $2H_2 + O_2 \rightarrow 2H_2O$ (producing water vapor). The hydrogen chloride is recovered as hydrochloric acid by scrubbing with water. The excess hydrogen is recovered by absorbing the $CO_2$ in an absorbent and then dehydrating the residual gas.

It is generally known that the oxygen content of the cell gas decreases with lower pH of electrolyte simultaneously as chlorine losses increases. Using a combustion chamber for recovery of chlorine losses as hydrochloric acid the cell may be operated at low pH and thus benefit by resulting improved current efficiency as well as lower electrode consumption. In fact, as shown in FIGURE 1 chlorine may be added to the cell gases through line 29 for complete combustion of all hydrogen to hydrochloric acid and water vapor. The residual gas, mainly containing water vapor and carbon dioxide may be partly recirculated for control of hydrogen and chlorine concentrations to avoid an explosive gas composition.

Figure 2:
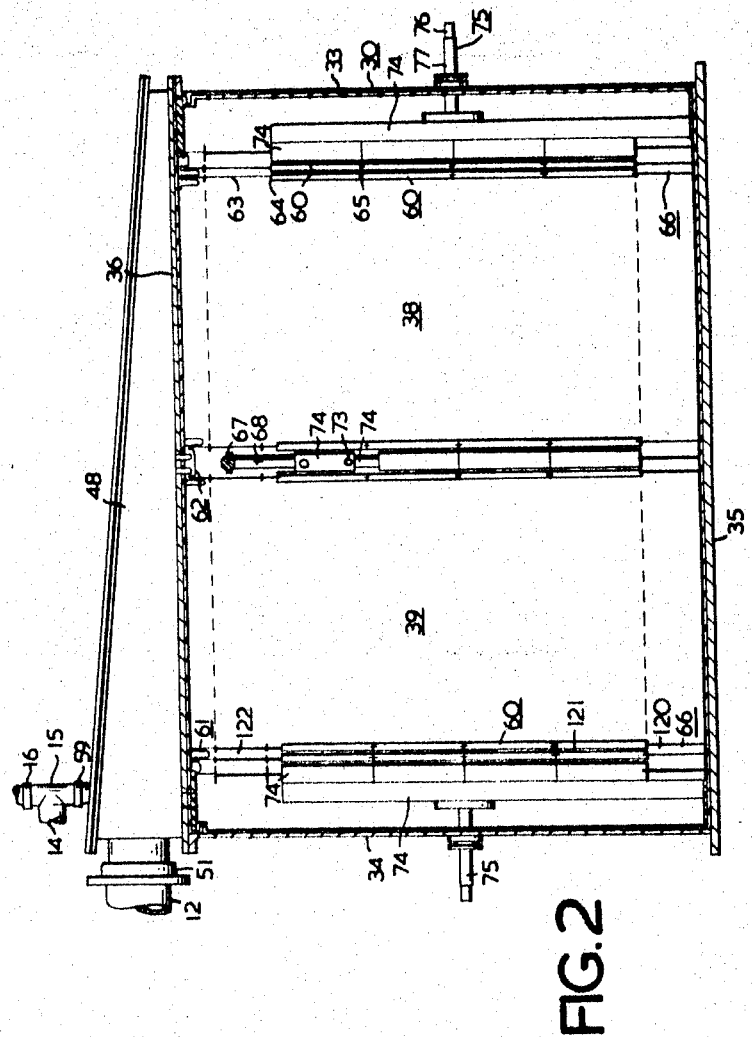
FIGURE 2 is a central longitudinal side cross-section of one embodiment of the electrolytic cell of the present invention.
Figure 3:
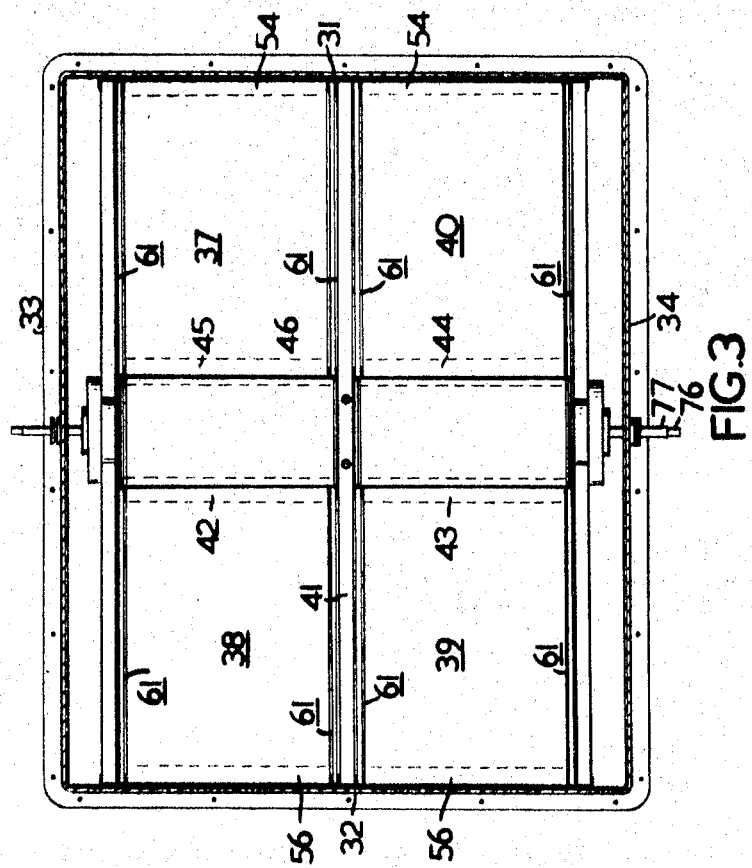
FIGURE 3 is a top plan view of the electrolytic cell of FIGURE 2 with the cover removed.
Figure 4:
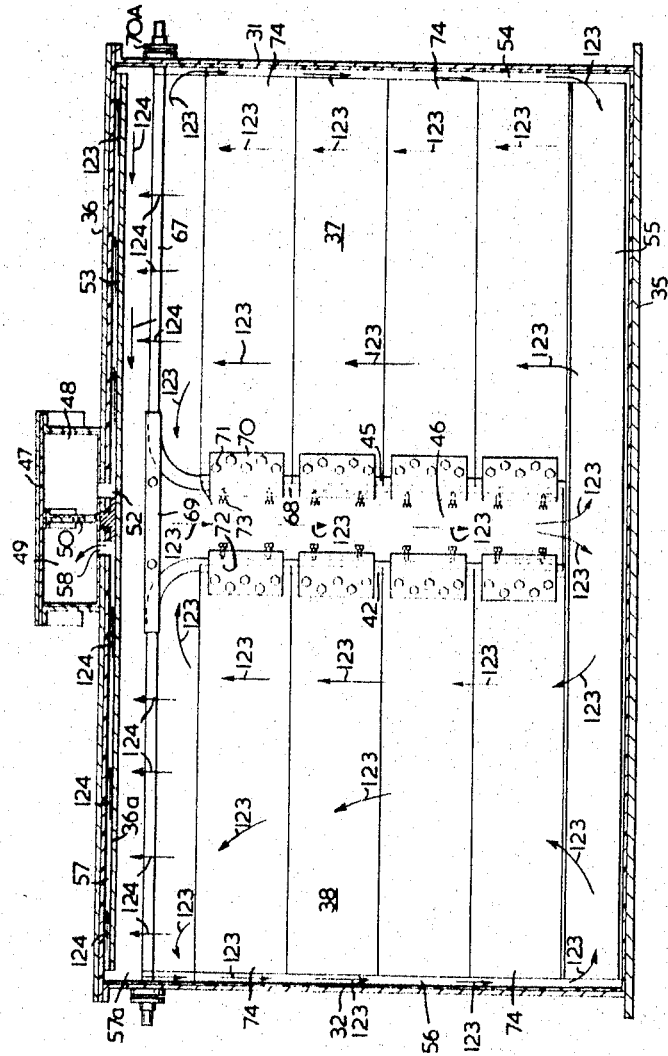
FIGURE 4 is a central longitudinal side cross-section of one embodiment of the electrolytic cell of the present invention.

One embodiment of an electrolytic cell adapted to carry out the electrolytic reaction in electrolytic cell 13 of FIGURE 1, is shown in FIGURES 2, 3 and 4. The cell made up of four sub-cells enclosed in a generally rectangular closed vessel 30, provided with side walls 31, and 32, back wall 33, front wall 34, bottom wall 35 and top closure means generally indicated at 36. The cell 30 itself is preferably made of nonconducting and cell liquor inert materials such as unplasticized polyvinyl chloride or steel li ned with a non-conducting and cell liquor inert material such as Penton. One of the suitably unplasticized polyvinyl chlorides which may be used is that known by the trademark of Darvic which has the following property:

Mechanical.—Hard material with very high impact-resistance, at 68° F. it has the following mechanical properties:

| | |
|---|---|
| Tensile strength (lb./in.²) | 8,000 |
| Youngs Moldulus (lb./in.²) | 4.8 x 10⁵ |
| Impact Strength (ft. lb.) | 12 |
| Brinell Hardness (3 kg. 2 mm. ball) | 17–18 |
| Specific Gravity (average) | 1.44 |

Chemical.—Excellent resistance to inorganic chemicals and very good resistance to many organic chemicals. Aromatic and chlorinated hydrocarbons may cause it to swell. The water absorption is negligible. It is highly resistant to acids but high concentrations of some oxidizing acids attack it. Low concentrations of bromine and fluorine and moist chlorine at elevated temperatures slowly attack it. It is resistant to all but most severe oxidizing conditions. It is resistant to a wide range of organic liquids but will absorb aromatic, chlorinated hydrocarbons, ketones and esters.

Thermal.—It has exceptionally low thermal conductivity and specific heat, but compared to metals, it has a high coefficient of expansion.

Penton is the registered trademark of Hercules Product Company for chlorinated polyether, of high molecular weight, linear in nature, crystalline in character and extremely resistant to thermal degradation at molding and extrusion temperatures.

As indicated hereinbefore, the embodiment of the electrolytic cell shown in FIGURES 2, 3, and 4, is provided with four quadrant subcells 37, 38, 39 and 40. Each of these sub-cells is composed of a separate plurality of individual cell channels 121 operating in the conventional manner as a bipolar electrolytic cell, provided by a pair of spaced-apjart monopolar electrodes 73, 74, with a plurality of bipolar electrodes 60 regularly spaced between the monopolar electrodes 73, 74. This will be described hereinafter. The four quadrants 37, 38, 39 and 40 are provided by means of a longitudinally extending central cell divider 41 and by four transverse internal quadrant walls, 42, 43, 44 and 45, arranged as shown more particularly in FIGURE 3 and FIGURE 4, to provide a central well 46.

Mounted on the top closure means 36 and forming a part thereof, is a header 47, which for the sake of convenience extends along the central longitudinal axis of the cell 30. The header 47 is divided by a central longitudinal wall 50, into an inlet header 48, and an outlet header 49. Inlet header is connected via connecting conduit 51 to inlet conduit 12, which was described hereinbefore with reference to FIGURE 1. From inlet header 48, inlet liquor enters sub-cells 37, 38, 39 and 40 by means of inlet sluice 52, upper horizontally disposed platella conduit 53, and then by transversely extending, vertically disposed inlet platella conduit 54 (defined by wall 31 and the ends of the bipolar electrodes 60 which will be described hereinafter) and is fed to the generally horizontally extending bottom strata 55, of the cell 30. Conduit 54 also provides a recirculatory channel for sub-cells 37, 40. A similar recirculatory, transversely extending vertically disposed platella conduit 56 for sub-cells 38 and 39 is provided by the space between side wall 32, and the ends of the bipolar electrodes 60 which will be described hereinafter. Central well 46 provides a vertically disposed central longitudinal transversely extending recirculatory conduit for all sub-cells 37, 38, 39 and 40. Outlet from cell 30 is provided by means of passage through an upper transversely extending outlet slot 57a in conduit 56, leading to upper horizontally disposed longitudinally extending outlet platella conduit 57, which communicates via channel 58, to outlet header 49. Outlet header 49 is connected through a coupling 59, to T-joint 15, and outlet conduits 14 and 15 as was described hereinbefore, with reference to FIGURE 1.

As shown more fully in FIGURE 2, within each sub-cell 37, 38, 39 and 40 is a plurality of closely spaced apart transversely extending, horizontally stacked, bipolar graphite electrodes 60. Each set of such transversely extending horizontally stacked, bipolar electrodes 60, is maintained in the necessary spaced apart relationship to provide electrolyte channels (or interelectrode spaces) 121 and also to provide upper recirculatory and effluent chambers 122 by means of upper end seals and spacers 61, and by means of lower seal 66 to provide a lower recirculatory chamber 120. The interelectrode spaces 121 are usually of the order of ⅛ inch to one inch (at start up) for graphite electrodes 60 of thickness ¾ inch. As the electrolysis proceeds, however, such interelectrode spaces increase in width. Seals 61 and 66 will be described hereinafter, more fully with reference to FIGURES 5 and 6 and 9 and 11 respectively. The adjacent sets of such electrodes 60 in different sub-cells are maintained in their essential spaced apart relationships by means of central and intermediate seals and spacers 62, to be more fully described with reference to FIGURES 5 and 6. Each set of electrodes 60 is maintained in liquid tight relationship with adjacent such sets by means of graphite receptacle closures to be more fully described with reference to FIGURES 5, 6 and 7.

The upper bipolar electrode 60 of each such set of electrodes is maintained in liquid type relationship with its associated cell divider plate 63, by means of a gasket 64 to be described hereinafter, with reference to FIGURE 7. Each vicinal bipolar electrode 60 in each set is fluid tight sealably connected to its neighbour by means of seal 65 to be described hereinafter, with reference to FIGURE 8. Finally, the bottom bipolar electrode of each such set is maintained in its liquid tight sealed relationship to its adjacent set by means of seal 66 to be described in greater detail hereinafter with reference to FIGURES 9 and 11.

The cell 30 is provided with a central current connector for the monopolar electrode having a horizontally extending segment 67 and a vertically extending section 68. The vertically extending section 68 extends parallel to the transverse axis of the cell 30. As shown more closely in FIGURE 4, there are two such current connectors joined by a clamp 69. The central current connector enters the cell by means of a gland structure 70A which will be more fully described with reference to FIGURE 10. The vertical section of the connector is connected to each of its associated adjacent monopolar electrodes 74, by means of a clamp 70 of U-shaped cross-section which is bolted by bolts 71, which are preferably formed of titanium. The interior end of each monopolar electrode 74 is provided with a semi-cylindrical vertically extending groove 72 so that the cylindrical connector 68 may be snugly retained thereon by bolts 73, which are also preferably formed of titanium, threaded into clamps 70 and abutting connector 68.

Certain features should be noted at the present time. Thus, it is to be observed that each sub-cell 37, 38, 39 and 40 is a bipolar cell provided by central transversely extending monopolar electrodes 74 and lateral transversely extending monopolar electrodes 74, with a plurality of bipolar electrodes 60 disposed uniformly therebetween. The central current connectors 67 and 68 preferably are formed of a titanium tube surrounding a highly conductive core, such as copper or aluminum, and having a plating of platinum to provide a highly conducting and oxidation resistant metal skin. There is thus a platinum surface between the titanium and the graphite to inhibit oxidation of the titanium.

While the cell has been shown with a central current connector for use with horizontal and vertical sections, the connector may of course be designed using the horizontal section only and installing the monopolar electrodes in the upright position. Furthermore, while this cell has been divided into four sub-cells or quadrants or compartments, the cell may also be designed for single compartment use by using only one of the central electrodes, or for multi-compartment uses, using more than four compartments by using more than one such central electrodes.

It is further to be observed that the size of the compartments may be adjusted as well. If the end connectors have the same polarity and if the number and spacing of the bipolar electrodes is equal, then the voltage drop and current flow will be equal in all compartments.

As shown more clearly in FIGURE 4, the ends of the bipolar electrode assembly 60 have monopolar electrodes 74 connected thereto by a face-to-face contact therewith. This is bolted or otherwise is secured to connector 75, which is permitted to enter the cell through a gland structure which may be that shown in FIGURE 10. Connector 75 as shown is titanium having a highly conductive core 76, and an oxidation resistant platinum skin 77, therearound.

The sealing structures will now be described, with particular reference firstly to FIGURES 5 and 6. It is seen that, disposed below the top closure 36 is a central channel member 78. It is noted that channel member 78 is generally U-shaped and that each of the upstanding legs of the U is provided with a downwardly extending flange 82. Disposed in the channel 83, between the legs of the U and the flange 82 is the upper portion of a grapite receptable divider plate 79.

Adjacent to channel member 78 and to plate 79 is an intermediate sealing U-shaped channel member 80. One of its legs 86 is provided with a pair of horizontally extending sealing ridges 85, and the channel member 80 terminates in a downwardly extending flange 84. The space between such leg 86 and the flange 84 is selected to be just wide enough to permit the entry therein of the flange 82 of channel member 78, which itself embraces divider plate 79. Divider plate 79 is kissed by ridges 85. The other leg 87 is provided at its terminus with a downwardly extending flange 88. The space between leg 87 and flange 88 is selected to be just wide enough to embrace divider plates 79. A plurality of such channel members 80—divider plate 79 units is provided, the number of units provided being equal to the number of sets of bipolar graphite electrodes 60. The marginal terminal channel member 81 at the edge of the side walls is shown in FIGURE 6.

It is, therefore, to be observed that the marginal channel 81 has one leg 89 provided on its outer surface with a horizontally extending sealing ridge 85, and this channel member 81 terminates in a downwardly extending flange 90. The space between leg 89 and flange 90 is selected to be just wide enough to permit the entry therein of the flange 82 of the adjacent channel 80, which in turn embraces divider plate 79. The divider plate 79 is in turn kissed by ridge 85. The other leg 91 of channel member 81 is provided with a downwardly extending flange 92 whose space is selected to be just wide enough to embrace marginal divider plate 94. Upper end closure 93 is provided integral with the side walls which closure is provided with a longitudinally extending groove 95, whose width is selected to be just wide enough snugly to embrace flange 92.

Each channel member 80 is provided with a pair of upwardly extending ridges associated with its flange 84 in order to assure better sealing contact between channel members 80 and the top closure 36, as will be further described hereinafter.

Turning now to FIGURE 7, it is noted that the lower end of each divider plate 79, is embraced by a longitudinally extending slot 96, in a sealing member 97. An O-ring 98 provides sealing contact between the sealing member 97 and the divider plate 79. The sealing member 97 is itself received in a slot 99 provided in the graphite electrode 60.

Turning now to FIGURE 8, it is noted that the upper edge of a lower graphite electrode 60 is provided with a longitudinally extending slot 104, into which the downwardly extending leg 101 of a T-shaped sealing member 100 is placed. The horizontal arms of the sealing member 100 are provided with a total of three upper longitudinally extending sealing ridges 102, and with a total of two lower longitudinal extending sealing ridges 103. The lower ridges 103 are adapted to kiss the upper edge 105 of the lower electrode 60, while the upper ridges 102 are adapted to kiss the lower edge 106 of the upper electrode 60.

Figure 11:
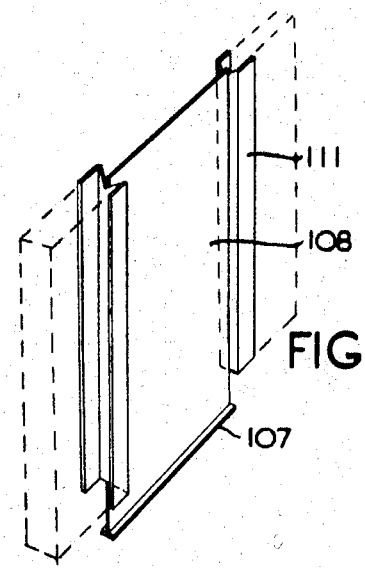
FIGURE 11 is an isometric view of the central well equipped with side channels.

Turning now to FIGURES 9 and 11, a bottom sealing member 107 is of generally trapezoidal cross-section and is provided with three longitudinally extending sealing ridges 109, adapted to kiss the bottom wall 35, and upper slot 110, extending longitudinally of the axis of the sealing member 107, and extending downwardly from the top portion thereof. Within slot 110 is snugly inserted the circulating chamber dividing plate 108. At the marginal edges of each such divider 108 is a U-channel 111 (see FIG. 11) adapted to abut the side walls of the electrolytic cell 30.

It is seen, therefore, that the lower electrode 60 of the set bipolar electrodes rests with its weight on the circulating chamber divider 109, which weight is transferred through ridges 109, to the bottom wall 35. Each superposed electrode 60 adds its weight to the lower bipolar electrode 60 through ridges 102 and 103. The weight of divider wall 79 is transmitted to the upper bipolar electrode 60 of the set of electrodes through the slot 99. Again the combined weight of the channel members 78, 80 and 81 is transferred to the upper edge of the divider plates 79, and 94. Finally, a portion of the weight of the top closure 36, is transmitted via ridges on flanges 84, which are integral with channel member 80. Thus, an efficient seal is provided by means of the weight of the members being sealed together, and by means of the securing of the cover 36 to the main side walls and end walls of the cell 30.

The materials out of which the sealing and channel members 78, 79, 80 and 81, 94, 97, 100, 107, 108 and 111 are made, must be electrical non-conductors and be of cell liquor inert material. Thus, divider plates 79, 94 and 108 may be made of a rigid methacrylate polymer such as that known by the registered trademark of "Plexiglas" or "Lucite," or alternatively they may be made of a rigid polyvinyl choride. The sealing members 97, 100, 107 and 111 and the channel members 78, 80 and 81 may be made of natural or synthetic rubber or of the material known by the registered trademark of "Hypalon," or of polyvinyl chloride or of polyethylene or polypropylene.

Figure 10:
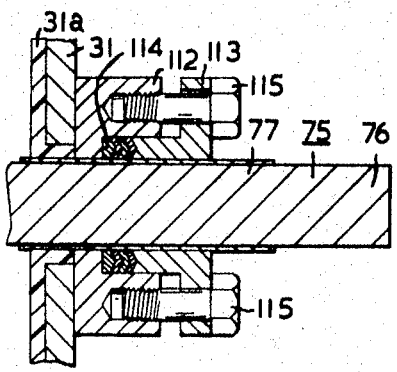
FIGURE 10 is a typical packing box assembly for the electrode connectors.

One embodiment of a gland structure is now shown in FIGURE 10. The monopolar electrode 75 consists of a core 76 of a highly conductive metal such as copper, a shell of a conductive but chemically resistant metal 76 such as titanium, and a skin of a highly corrosion-resistant metal 77, such as platinum. The wall 31, of the cell 30 may be lined with a non-corrosive lining 31a, such as saran. A collar 112 is secured to the outside wall 31 and a gland bushing with "chevron" packing 114, is placed around electrode conductor 75. The bushing and packing are held to the collar and also secured to the connector 75 thereto by means of bolts 115. Bolts 115 pass through associated apertures in an annular packing retainer 113.

In operation, the electric current flows from one cell to the other due to the potential differences and voltage pressures. The current thus flow from a monopolar electrode to one face of the bipolar electrode with a high voltage drop therebetween, due to the electrolyte circulating therebetween. Then, the current passes from that one side to the other side of the bipolar electrode and since the electrical resistivity of graphite is in the order of 0.000 to 0.0005 ohm inch there is essentially no voltage drop. The current passes from that one side to the adjacent side of an adjacent bipolar electrode with a corresponding voltage drop therebetween as the current passes through the electrolyte. The current passes this way from one side of a bipolar electrode to the other side to one side of another bipolar electrode until the current finally passes from one side of a bipolar electrode to the monopolar electrode. Thus, electric current enters the cell unit through connector 67, 68 to the anode power connector 70 and along monopolar electrode 74 and travels between bipolar electrodes 60 through electrolyte in chambers 120 and thence to the monopolar electrode 74, (which is thus the cathode) and out via conductor 76. Alternatively, connector 67 may be the cathode and connector 76 may be the anode.

The electrolyte enters the cell 30 via inlet 52, channel 53 and channel 54, to strata 55, or discharge at outlet of channel 53, from whence it is uniformly distributed to each chamber 120 of each of the sub-cells 37, 38, 39 and 40. The electrolyte may adopt the flow pattern shown by arrows 123, through each of the chambers 12, which pattern is a recirculatory pattern upwardly through the electrolytically active cell channels 121, to recirculatory channel 122, and then downwardly again either by channels 56 and/or 54 and/or by central wall 46. On the other hand, since the products of the electrolysis are gaseous, lighter liquor may follow the path of arrows 124, through outlet 57a, outlet channel 57, and 58, and thence to outlet header 49.

Figure 12:
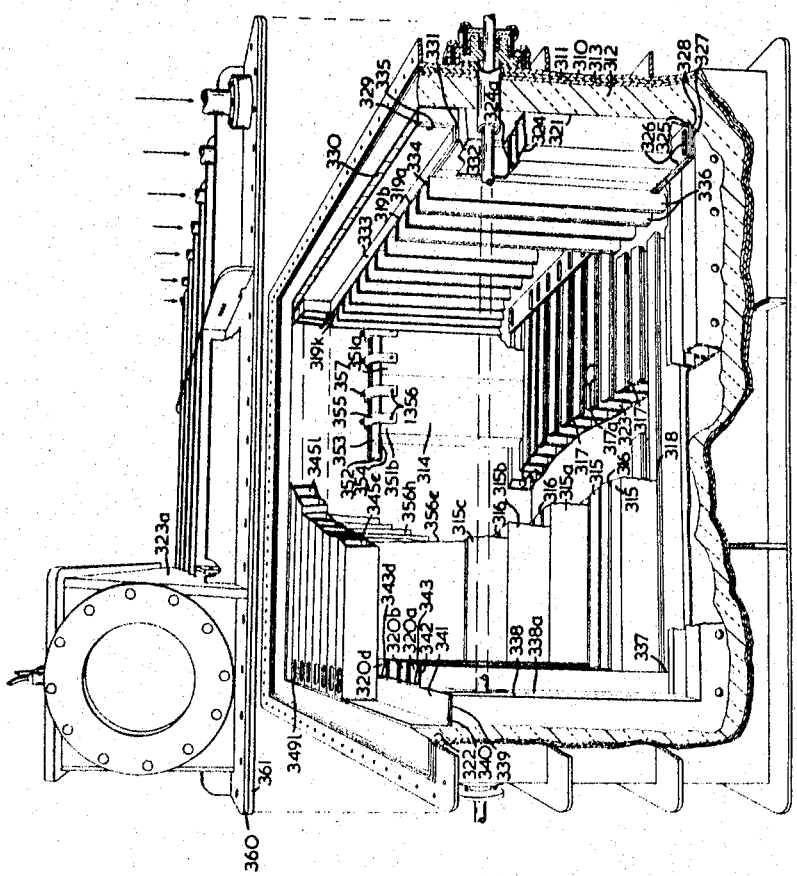
FIGURE 12 is an isometric view of another embodiment of this invention.

Turning now to FIG. 12, the electrolytic apparatus comprises a main rigid durable outer shell 310, which may preferably be of steel. A lining 311 is provided for the main tank and this lining 311 is firmly adherent to the inner walls of the shell 310. The lining 311 may be of natural rubber, "Hypalon" or other suitable lining which affords electrical and chemical resistance. If desired, the lining 311 for the tank may be of a rubber material which is both chemically and electrically resistant. On the other hand, it may be desirable to line the tank with an additional layer of chemically resistant brick 312. In order to provide for an integral structure, the brick 312 is cemented to the intermediate lining 311 by means, for example, of a grout or of a polyester type cement 313. The chemically resistant brick lining 312 also serves the important function of maintaining close tolerance of dimension within the cell. This serves to minimize current leakage between adjacent rods 352 where a plurality of such rods are provided, two of which being shown in FIG. 12.

The electrolytic apparatus of this aspect of the present invention is based on a modular construction. While the embodiment of FIGURE 12 shows one module, the cell unit may comprise any number of modules, each electrically connected in parallel or in series as may be desired. If they are connected in parallel, alternate bipolar electrodes will be connected individually to an anode bus-bar and a cathode bus-bar. If they are connected in series, it is only necessary to have an alternately spaced arrangement of anode-cathode-anode, etc.

Each module of this aspect of the present invention comprises a pair of spaced apart monopolar electrodes 314 and a plurality of closely spaced bipolar electrodes 315. Each of the bipolar electrodes is provided by a plurality of stacked, longitudinally disposed graphite electrodes 315, 315a, 315b, etc. The graphite electrodes 315, 315a, 315b, 315c, etc. may be joined together between their longitudinally extending top and bottom faces in the manner shown hereinbefore in FIGURE 8. Alternatively, the individual graphite electrodes 315, 315a, 315b, 315c, etc. in the stack may be together at their joints to provide a chemically resistant joint by using a suitable cement, to fill the voids between the plates when they are assembled. This cement solidifies as a solid gasket seal. A suitable type of cement is a polyvinyl chloride cement, but other cements or compounds could be used, such as polyesters or various types of rubbers or plastic.

The lowermost graphite bipolar electrode in the stack 315 may be mounted on the bottom of the tank in a manner shown in FIGURE 8. However, an alternative construction which will be described hereinafter may also be used.

The upper bipolar graphite electrode in each stack 315c may be rigidly secured within the module in a manner hereinbefore described with reference to FIGURE 7. On the other hand, it may be held in place in a manner to be described hereinafter.

Each module consists of a plurality of electrolyte chambers (or interelectrode spaces) 316, each of the chambers having a longitudinally extending slotted inlet means 317 to provide for the entry of the electrolyte to each chamber 316. The slotted inlet means are spaced apart by a distance 317 greater than the thickness of the graphite bipolar electrodes 315, 315a, 315b, 315c. Thus, there is provided one stack of said electrodes 315, 315a, etc. preferably situated between a pair of such slotted longitudinally extending inlet means 317. Each bipolar electrode 315, 315a, etc. of the stack rests upon a sealing flexible and compressible chemically resistant gasket 318, for example, and preferably of natural rubber, "Hypalon" or other suitable lining.

Each stack in the plurality of stacks of bipolar electrodes 315, 315a, etc. is located and positioned within the module by means of a pair of diametrically opposed vertically disposed U-shaped channel spacing members 319a, 319b, etc. 319k and 320a, 320b, etc. The spacing 321 between the arms 336 of the U is equal to the thickness of the graphite bipolar electrodes 315a, 315b, etc. These U-shaped channel members 319a, 319b, etc. 320a, 320b, etc. are situated adjacent opposite end walls 321, 322 of the module, and are formed of a chemical and electrically resistant material, such as polyvinyl chloride.

The slotted bottom inlet channels 317 for the cell module are fed from an inlet bottom manifold 323. The feed inlet to the bottom manifold 323 may be of any type. Preferably, however, it consists of a plurality of channels 324, 324a etc., equal in number to the number of stacks of bipolar electrodes 315, 315a, etc., i.e., equal to one less than the number of sub-chambers 316 within the electrolytic chamber of the module. The plurality of channels 324, 324a, etc. are situated within the main shell 310 and are disposed in a vertical direction along its respective side wall 321. The vertically extending channels are provided with a bottom plate 325 rigidly and permanently secured thereto, the bottom plate having a plurality of slotted apertures 326 therein. A bottom sealing plate 327 is also rigidly secured to the bottom manifold 323 and this plate also has a plurality of slotted apertures 326 therein. Disposed between the sealing plate 325 of the inlet channels and the sealing plate 327 of the bottom manifold is a slotted gasket 328, the slots being in registry with the slots 326 in the sealing plates 325 and 327. The slotted sealing plates 325 and 327 and the gasket 328 are each made of a suitable chemically and electrically resistant material, such as rubber or polyvinyl chloride.

Disposed at the top of inlet channels 324, 324a, etc. is an L-shaped member 329, the vertical portion of the L-shaped member defining an inlet header 330 for the inlet conduits 324, 324a, etc. The horizontally extending leg 331 of the L-shaped member 329 extends as far as the U-shaped channels 319, 319a, etc. supporting the plurality of stacks bipolar electrodes 315, 315a, etc. and provides a ledge 332 whose purpose will be described hereinafter. Disposed on the ledge 332 is a sealing gasket 333 of a suitable chemical resistant rubbery material. This sealing gasket 333 is disposed a slight distance above the upper ends 334 of the U-shaped channel members 319, 319a, 319b, etc. Secured to the inner face of the vertically extending leg of the L-shaped member 329 is a sealing liner 335 of suitable chemical and electrical resistant material.

The lower portions 336 of the legs of each of the U-shaped channel members 319, 319a, etc. extend below the sealing plate 325 of the inlet channel to which the U-shaped channel members are attached. This extension 336 is adapted to provide a flange which enters a key way 337 defined by the longitudinally extending inlet channel 317 of each module. This cooperation, therefore, assists in locking the inlet conduit sub-assembly in its desired position.

Figure 15:
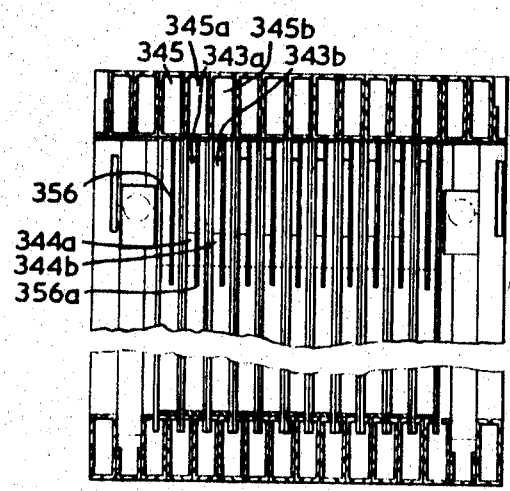
FIGURE 15 is another sectional view of the embodiment of FIGURE 12.
Figure 16:
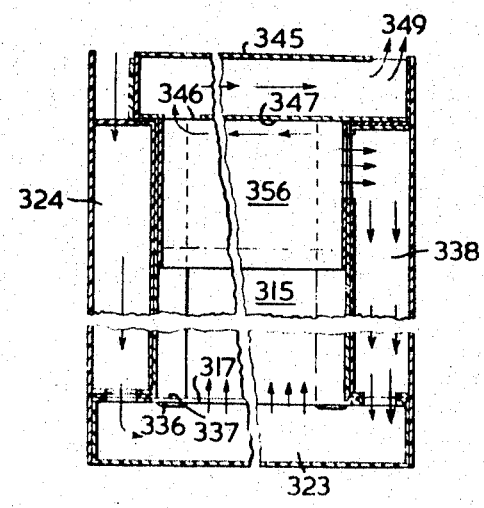
FIGURE 16 is another sectional view of the embodiment of FIGURE 12.

The other plurality of U-shaped channels 320, 320a, etc. are connected to a plurality of recirculatory conduits 338, 338a, etc. which in their bottom structure, are identical with the bottom structure of the inlet conduits 324, 324a, etc. and will not, therefore, be described further. However, the upper portion of each is provided with a sealing closure plate 339 rigidly secured to the top thereof to provide a ledge 340 whose purpose will be described hereinafter. The ledge 340 is provided with a sealing gasket 341 superimposed thereon, the eventual height of the gasket 341 being slightly higher than the upper extremity 342 of the U-shaped channels which are attached to the recirculatory conduits 338, 338a, etc. The recirculatory conduits are in its upper reaches each connected to its respective chamber 356, 356e, 356h by means of a slot 343, 343a, etc. The entry is to a vertically extending non-electrolytically active chamber 344, 344a, etc. as is shown in FIG. 15. This chamber 344, 344a is connected to a longitudinally extending conduit 345, 345a, 345b, etc. by means of a slotted communication 346, 346a, 346b, etc. on the bottom face 347, 347a, etc. of said conduit as is shown in FIG. 16. Such a conduit is connected to an outlet header 348 by means of a slot 349, 349a, 349b, etc. on the upper diametrically opposed surface 350, 350a, 350b, etc. thereof.

Figure 14:
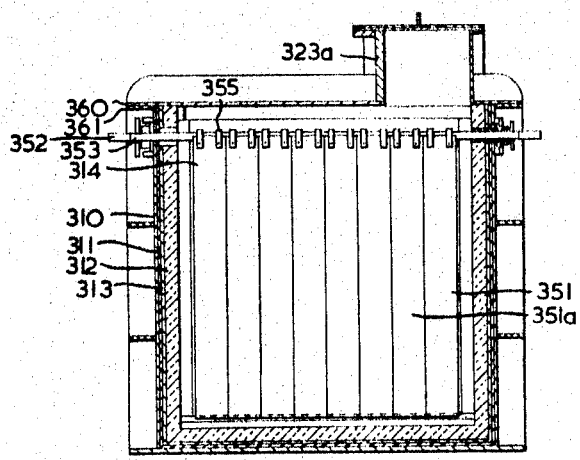
FIGURE 14 is a sectional view of the embodiment of FIGURE 12.

As is conventional with a bipolar electrolytic cell, the terminal stack of bipolar electrodes 315, 315k is each situated adjacent a monopolar electrode 314. The monopolar electrode consists in one embodiment thereof, of a plurality of vertically extending graphite electrodes 351, 351a, 351b, etc. as is shown in FIG. 14. The graphite electrodes extend throughout the entire operative electrolytic height of the electrolytic module. One of the electrodes 314 is an anode and the other of the electrodes is a cathode, and it is irrelevant which electrode is the cathode or the anode. It is preferred that each of the connectors which connect the monopolar electrodes 314 to the positive or to the negative pole comprise a solid core 352 of high electrical conductivity, namely, of copper, aluminium or other suitable electrical conductor. The core 352 is sheathed with a tube of an electrically conducting chemically resisting material 353 such as titanium, zirconium or the like. 180 degrees of the segment of the circumference of such chemically resistant tube is plantinized 354 so that all areas of contact between the graphite monopolar electrode and the connector is through a platinum-to-carbon connection. The connection is assured by means of U-clamps 355 rigidly secured as by titanium bolts 356 to the graphite 351a, 351b, etc. and to the connector 352 by bolts 357. The electrode passes out the side walls of the electrolytic apparatus through a gland, one embodiment of which was described with reference to FIG. 10, another embodiment of which will be described with reference to FIG. 17 hereinafter.

Figure 13:
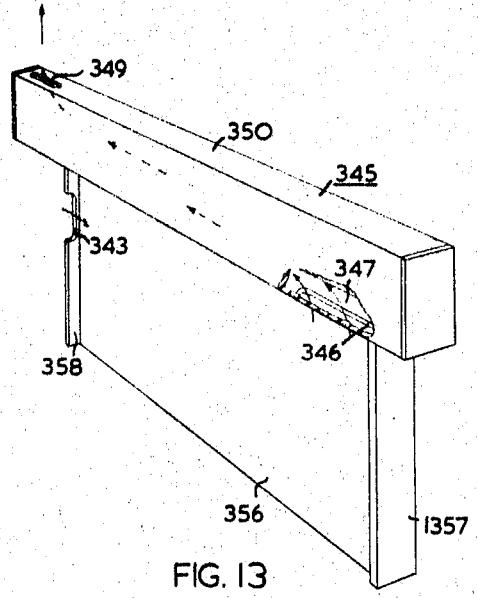
FIGURE 13 is an isometric view of a component of the embodiment of FIGURE 12.

Each electrolytic sub-cell is provided with an electrolytic portion 316 bounded on its sides by the bipolar stacked graphite electrodes 315, 315a, etc. or by the bipolar electrode 315, 315k, and a monopolar electrode 314 and a non-electrolytic chamber 344 wherein the products-of-electrolysis accumulate bounded on its sides by a plate 356, 356a, etc. of suitable electrically resistant and a chemically resistant plastic material, such as polyvinyl chloride. Each of the chemically and electrically resistant divider plates 356, 356a, etc. consists of a longitudinally extending plate 356, 356a, 356b, etc. provided at one end with a cross plate 1357, 1357a, etc. as shown in FIG. 13 selected to be of the same width as each of the stacked bipolar graphite electrodes 315, 315a, etc. and adapted to be retained within an associated U-shaped channel member 319, 319a, etc. The cross piece 358, 358a, etc. at the other end of the longitudinally extending insulating member is provided with a slot 343, 343a, etc. in registry with a corresponding slot in the upper portion of the cross piece of the associated U-shaped channel member 320, 320a, etc., such slots communicating with the recirculatory conduit 338. Also mounted at the upper portion of each said longitudinally extending insulating plate 356, 356a, etc. is a longitudinally extending hollow conduit 345, 345a, etc. provided with a slotted opening 346, 346a, etc. in its lower face 347, 347a, etc. at a position adjacent the inlet conduit 324, 324a, etc. of the electrolytic apparatus. The longitudinally extending conduits 345, 345a, etc. is provided with a slotted aperture 349, 349a, etc. at its upper face 350, 350a, etc. adjacent the recirculatory conduit 338. The slots 349, 349a, etc. communicate directly with an outlet header 323. The outlet header 323 is rigidly secured to a cover plate 360 which is provided with a sealing gasket 361 secured thereto.

The heights of the various components within the cell are such that when the cover plate 360 is secured to the body of the cell 310, all the components of the cell are rigidly and securely pressed together to form a positive fit.

The internal circulation within cell 310 is shown in FIGS. 15 and 16. The electrolyte and liquor enters via inlet conduit 324 and is distributed to flow upwardly from manifold 323 via slots 317.

Lighter, liquor and electrolyte containing entrained gaseous products of electrolysis moves upwardly from slot 317 to the lower face 347 of conduit 345 until it reaches outlet slot 346. Then it travels through conduit 345 and through slot 349 to header 323a. Some of the lighter liquor and electrolyte moving upwardly from slot 317 is caused to enter recirculatory conduit 338 through slots 343. Such liquor and electrolyte flows downwardly in recirculatory channel 338 to slot 326 where it enters manifold 323 to be redistributed and recirculated through slots 317. Thus, flow is by means of forced external circulation by liquor pumped downwardly in conduit 324 and forced upwardly through slot 317. In addition flow is through interelectrode spaces 316, upwardly into enlarged electrolyte channels 344 and downwardly through recirculatory conduit 338.

Figure 17:
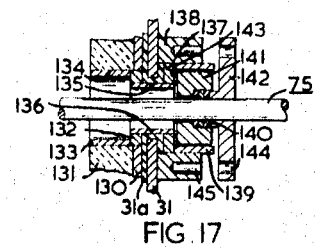
FIGURE 17 is a cross sectional view of another packing box assembly for the electrode connectors.

FIGURE 17 shows another embodiment of a gland structure which provides for the liquid-tight sealing entry of the electrodes 75 into the cell 30. This embodiment is particularly adapted for use with a cell 30 formed of a steel tank 31, lined with a chemically resistant lining, such as saran 31a, and also provided with an additional lining of chemically resistant brick 131, held to the lining 31a by means of grout 130. The gland construction includes a first tube of 133 secured within an aperture 134 of the brick 131, which in turn is secured to a ring 132 which is fixed to the saran lining 131a, and also to the grout 130. Secured to the inner portion of the annulus 132, and within an aperture 135 in the saran lined steel tank 31a is another tube 136 of external diameter less than that of tube 133. Secured to tube 136 is a second annular ring 133, whose internal diameter is just slightly greater than the external diameter of tube 136, and whose external diameter is just slightly less than the internal diameter of a flange 132, 137 by flange 138, welded onto the steel wall 31. An additional tube 139 whose external diameter is just slightly less than the internal diameter of flange 138 is secured to second ring 137.

The gland structure itself comprises a packing material 140, made of suitable material such as Teflon (polytetrafluorethylene) inserted in a recess disposed within annular packing member 141, and adapted to be held in place by means of packing flange 142. Tubes 133, 136 and 139 as well as rings 132 and 137 and packing member 141 and packing flange 142 are preferably formed of a chemically resistant and electrically resistant material such as polyvinyl chloride. A gasket 143 is disposed between ring 137 and packing member 141. The structure is maintained in place by means of bolts (not shown) passing through registering holes 144 in packing flange 142 and tapped apertures 145 within welded on flange 138.

The gland structure is particularly suitable when it is desirable to remove the current connector 67 or 75. In order to do this it is merely necessary to remove the current connector (67 or 75) by pulling the connector (67 or 75) from one side until it is free from the opposite gland 70A and then tilting the connector (67 or 75) and removing the connector through the top of the cell 30. In this manner the bipolar cell units 60 may be placed quite close together, and thus minimize space requirement.

FIGURE 17 shows an alternative for gland structure if the cell units are placed far enough apart to allow removing the connector by pulling straight out.

Another embodiment of the present invention which may be used in conjunction with the embodiment shown either in FIGURES 2–11 or in the embodiments shown in FIGURES 12–16 is shown in the form of a complete electrolytic cell in FIGURES 18–22. However, it is to be noted that this is a general improvement in electrolytic cells which may be of the bipolar or the filter press type.

Quite generally, in this embodiment of the present invention the bipolar electrodes and/or the monopolar electrodes are in the form of flat electrically conductive sheetings. The sheets may be of relatively thick self-supporting material or they may be of relatively thin self-supporting material, in the latter case, they may be corrugated to enlarge the surface area up to 57%, to improve the rigidity thereof, and to minimize the apparent length. The sheets may be formed of steel (if it is desired to electrolyze water) platinized titanium (if it is desired to electrolyze brine and/or chlorate solutions); or any other desirable metal sheeting. In addition alternate sheets may be in the form of diaphragms where it is desired for the production of chlorine and alkali or oxygen and hydrogen. The diaphragms are installed in the same manner as the electrodes, as will be further described hereinafter, with reference to FIGURE 19.

The sheet metal electrodes have several functions in the present electrolytic apparatus which will now be generally described. In the first place, they may act as bipolar electrodes. In the second place, with suitable modifications they may act as diaphragms. In the third place the electrodes separate the cell into a plurality of electrolytic cell chambers and act as divider walls for channeling the liquor between the bottom and the top of the cell.

The sheets may be either used as such or may be coated with a material which is a poor electrical conductor, or is an electrical non-conductor, or with a chemically resistant metal. Thus, the sheets may be partially coated with polyethylene or polyester materials in order to provide both insulating and conducting areas. Another manner of providing insulating and non-insulating areas is to use unplatinized titanium electrodes. In use the unplatinized portions will be oxidized to titanium oxide which is a poor conductor. It is also possible to coat the sheet metal electrodes with platinum on both sides and accordingly, the apparatus would be suitable for operation with reversed current directions when desired.

Figure 18:
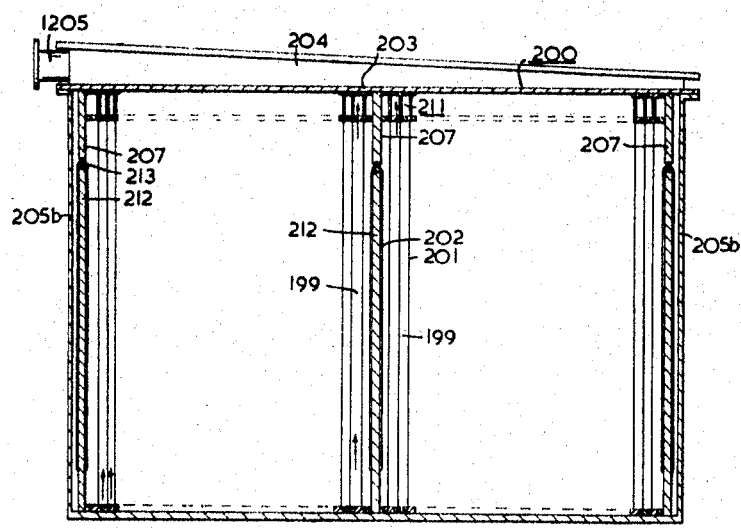
FIGURE 18 is a central longitudinal side cross-section of another embodiment of this invention.

Turning now more specifically to FIGURE 18, it is seen that the electrolytic cell 200, is provided with a top cover 203, upon which is an inlet and an outlet header 204 provided with inlet means 1205. The exact construction of the inlet and outlet headers 204 will be described in FIG. 21. The cell is provided with side walls 205b and bottom wall 206 of material which is resistant to the cell liquor and electrical current. The plurality of bipolar electrodes 201 are supported at their top and bottom faces by sealing conduits 211, which will be described hereinafter with reference to FIGURE 19. The monopolar electrodes 202 are enveloped around the supporting plate 212, and are provided with current connectors 213, which will be described in greater detail with reference to FIGURES 20 and 22. The contact pressure between monopolar electrodes 202 and current connector 213 is achieved by the pressure from plate 207 when cover 203 is bolted to tank 205b.

Figure 19:
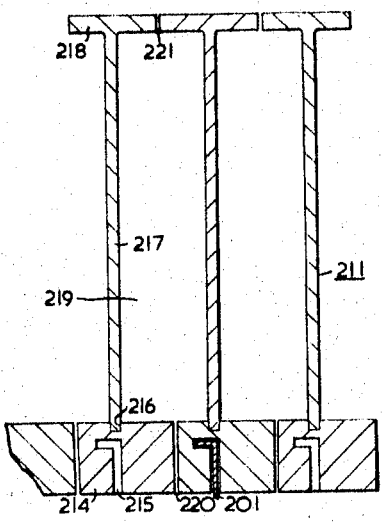
FIGURE 19 is a central section of another embodiment of spacers and conduits of this invention.

Turning now to FIGURE 19, it is seen that sealing conduits 211 are comprised of a plurality of blocks 214, formed of electrically and chemically resistant material such as polyvinyl chloride. Channels 215 are provided along the longitudinal direction of the blocks 214 in order to accommodate bipolar electrodes 201. The conduit portion 219 is provided between two adjacent T-shaped members 217, each of which is secured in a longitudinal slot 216 in a respective adjacent block 214. Adjacent blocks 214 are so disposed as to provide a complete seal between blocks or other means may be used to cause a complete seal 220 between blocks such as cement, or gaskets. The horizontal portion 218 of the T-shaped members 217 are spaced to minimize or eliminate the conduit channel 221 or other seals are used such as cement, or compounds, or gaskets, to eliminate said channel.

Figure 20:
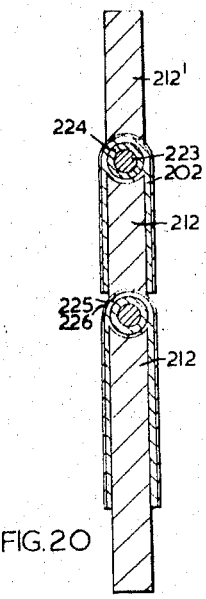
FIGURE 20 is a central section of an embodiment of monopolar electrodes of this invention.

An alternative form of monopolar electrode 202 is shown in FIGURE 20. Here, the central monopolar electrode 202 is shown divided into two or more units each having its own current connector 223 and supporting plate 212 therein. Each monopolar electrode 202 comprises an electrical conductive core 223 of copper or other electrically conducting material around which is a tube 224 of chemically resistant electrically conductive metal such as titanium. The platinized titanium outer sheet 202 is enveloped around the conductor 223 and 224 and the conducting core 212. When the unit is assembled the concave portion 225 of the supporting plate 212 rests in contact with the convex portion 226, of the platinum-clad titanium conducting envelope 202. The contact pressure between current connector 223 and electrode 202 is achieved by the pressure exerted on plate 207 when cover 203 is bolted to tank 205b.

Figure 21:
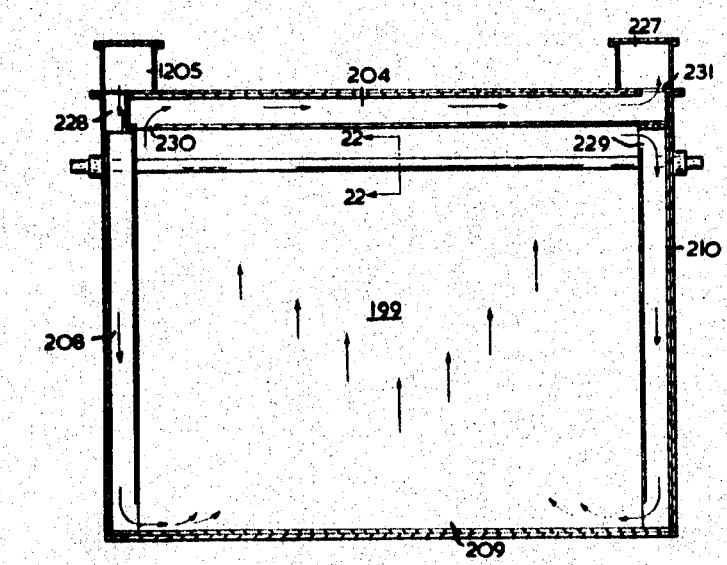
FIGURE 21 is a diagrammatic section showing the electrolyte circulator.

FIGURE 21 shows the circulation pattern of the electrolyte. The electrolyte and liquor enters by inlet conduit 1205 and proceeds by connecting conduit 228, to vertically extending inlet platella conduit 208. The electrolyte and liquor is then fed along bottom distributing channels 209, within each of the electrolytic cell units 199. The electrolyte and liquor may pass through recirculatory inlet slot 229, to recirculatory channel 210. Alternatively, liquor and electrolyte including entrained gaseous products of electrolysis and which is lighter in specific gravity than the inlet liquor may be forced to the top of the vessel where it enters outlet platella conduit 204, through outlet aperture 230 and thence to outlet conduit 227 via outlet aperture 231.

Figure 22:
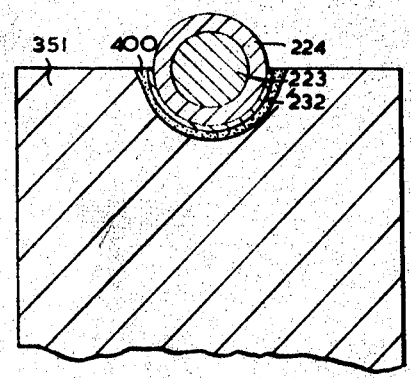
FIGURE 22 is a cross-section of a monopolar electrode and current connector combination.

The electrode which is preferably used is shown in FIGURE 22. This is shown to consist of a core 223 of copper or other similar conducting metal, a sheath 224 of titanium or other similar chemically resistant conducting metal, and a platinum chemical and oxidation resistant plating 232.

In order to assure that there is uniform contact between the electrode 351 and the platinum 232 of the current connector 223 a high conductive paste 400 is inserted in the space between the electrode 351 and the conductor 223. While any high conductive paste may be used, one based on graphite powder is preferred. An especially preferred such paste would have the following composition

| | Parts |
|---|---|
| Polyester resin (e.g. that known by the trademark of Hetron), including cobalt ion solution, 0.75% and dimethyl aniline 0.15% | 100 |
| Graphite powder | 100 |
| Catalyst (for polyester resin) | 0.2 |
| Styrene (to adjust consistency of paste) | 0.02–0.2 |

The paste is prepared from the above components to a suitable consistency. The paste is then smeared evenly onto the surface of the graphite monopolar electrode 351 which is to contact the current connector 223. The current connector is preferably coated with a suitable release agent (e.g. polyvinyl acetate) to prevent adherence of the paste 400 to the electrode 223. The current connector 223 is then placed in position in contact with the cement 400 and the graphite electrode 351 and is held down and clamped there. The paste is then squeezed out and remains only where there was a void between the electrode 351 and the connector 223. The paste then is permitted to solidify. It then becomes united with the graphite electrode 351 and gives a solid material contact of low electrical resistance as well as high chemical resistance to the electrolyte.

This results in a connection in which there are essentially no voids between the electrode 351 and the current conductor 223. This eliminates substantially the possibility of providing an electrolytic cell which would severely effect the life of the platinum plating 232. It also minimized the problem of high voltage drops between the connector 223 and the electrode 351.

The release coating on the connector 223 is used in order to prevent adherence of the cement 400 to it. In order to be useful as a connector, however, the electrically non-conductive release agent should be removed.

A prime feature in the operation is the internal circulation, shown by the arrows in FIGURE 4. Internal circulation is maintained partly because of gas lift due to formation of cell gases in the cell and partly because of the difference in specific gravity as hereinbefore noted. The flow of electrolyte, starting at the bottom of the cell 30 is upwardly between the sets of bipolar electrodes 60, across the top, downwardly through well 46 and then along bottom 55. Additional circulation may be achieved by designing the cell with a channel 56.

The liquor and electrolyte flows downwardly along channel 56 and along the bottom 55 and upwardly through electrodes 60. A portion of the liquor and electrolyte is removed from the cell along channel 57 and outlet 58. Fresh electrolyte, to compensate for removed liquor and electrolyte enters via inlet header 48, inlet 52, inlet channel 33 and downwardly in channel 54. Thus, the forced circulation is obtained by the head difference of liquor and electrolyte between inlet header 48 and outlet header 49. It is noted that while the cell has been shown with central inlet and outlet header, these headers may be separated and designed for any position along the cell cover.

The cell gases are entrapped in the effluent liquor and electrolyte and leave the cell unit together with the liquor, as described above, through outlet header 49, thence through coupling 59 to T-joint 15. The gases are partly separated from the liquor and electrolyte and are led off by conduit 16. The liquor and electrolyte is discharged through outlet 14 for treatment as described with reference to FIGURE 1.

As mentioned before, the cell in operation is self-compensating and self-regulating. As the current density increases, the amount of gases produced by the electrolysis reaction increases. This tends to decrease the specific gravity of the electrolyte in the interelectrode spaces 316 (see FIGS. 12 and 15). This causes the electrolyte to move upwardly faster, i.e. brings about an increase in flow velocity through the cell. When the electrolyte arrives at electrolyte channels 344 (see FIGS. 12 and 15) its specific gravity difference is not as great, and consequently it slows down slightly. This permits a greater volume of electrolyte to move downwardly in recirculatory channel 338 (see FIG. 16) thereby increasing the flow rate. Consequently, as the current density increases, the flow rate increases.

As the cell is used, its electrodes are consumed. Thus, the interelectrode spaces 316 are increased in width. This in effect reduces the above described difference in specific gravity and tends to reduce the flow rate of electrolyte through the cell.

Another inherent property of the cell of this invention is that the consumable electrodes may be used to their maximum amount.

Thus, since the interelectrode spaces 316 increase as the cell is used, and since the current density is maintained constant, the voltage increases. Hence periodic determination and plotting of voltage or time (with temperature and current density constant) yields a graph in which the voltage gradually increases. The initial voltage is dependent on the number of interelectrode spaces.

As the electrodes are consumed, their thickness decreases until finally one (or more) of the electrodes are completely eroded through. This reduces the number of interelectrode spaces. Consequently there is a discontinuity in the graph, and the voltage drops suddenly. At this point, the procedure is stopped and the electrodes are replaced by fresh electrodes.

Start-up again (or initially) is rapid. It is necessary merely to fill the system with brine and circulate it by force pumps. Then the full current density is applied. Start-up can be effected in minutes whereas, in the past, days were normally required.

The following Experiment A indicates the utility of such an electrolytic cell.

EXPERIMENT A

The electrodes consisted of a sheet of platinized titanium bolted to a graphite electrode in sodium chloride solution. The current density used was 100 amperes/square inch, contact pressure approximately 100 p.s.i. and the contact resistance was determined to 0.001-0.01 ohms for 1 square inch. There was no indication that the platinum would dissolve; the test was run for a total of 80 hours.

Four cells were employed in the unit using the end monopolar graphite electrodes and in-between bipolar graphite electrodes. The width of the electrodes was 6" and the height 48". The circulating chamber was ¾" x 2" in cross area. The electrolyte at start-up contained 300 g.p.l. NaCl and 3 g.p.l. $Na_2Cr_2O_7$; pH was approximately 6.5, and temperature 40–50° C. At 0.5 amp/sq. in., the cells internal circulation was approximately 5 feet/minute between the electrodes, ½" apart, and the anode current efficiency, based on gas analysis, was approximately 94%. When the circulating chamber was closed the efficiency dropped to 91%.

|  | With circulation | Without |
|---|---|---|
| Gas analysis: | | |
| $O_2$, vol. percent | 2.5 | 3.9 |
| $CO_2$, vol. percent | 0.4 | 0.5 |
| $Cl_2$, vol. percent | 0.2 | 0.2 |

The hypochlorite concentration was 1.5 g.p.l. and cell unit voltage was 12 volt; i.e., 3 volt/cell.

The production of chlorate from the sodium chlorate brine is dependent on the concentration of chloride ions. The efficiency of the reaction, on the other hand is dependent on the efficiency of the conversion of $Cl^-$ to $ClO_3^-$ by oxidation using the electric current. The maximum efficiency of 100% is based on the expenditure of 687 amp/hrs. to produce 1 lb. of chlorate. By the present invention minimum efficiencies of 88% are routinely achieved, i.e. the expenditure of a maximum of 782 amp/hrs./lb. chlorate. This compares to conventional cells which can be made to operate briefly at efficiencies as high as 75%.

I claim:

1. In an electrolysis system including at least one cell, provided by a pair of spaced apart monopolar electrodes and one or more bipolar electrodes disposed therebetween to provide a plurality of electrolytic channels, container means receiving said cell and including a cover therefor, and means for maintaining said cell full of electrolyte, the improvement comprising:
   (a) means for continuously introducing fresh electrolyte into said cell at a predetermined rate;
   (b) a plurality of channel-forming members operatively disposed with respect to said plurality of bipolar electrodes to provide a plurality of non-electrolytic channels within said container for recirculation of electrolyte within said cell, the recirculation rate being sufficiently high to maintain said gaseous reaction products entrained in the electrolyte within said container;
   (c) common outlet means connected directly to the container at a zone immediately below the cover for removing a mixture of gaseous reaction products and effluent liquor from said cell;
   (d) means outside of said container connected to said outlet means for receiving that mixture of gaseous reaction products and effluent liquor removed through said outlet means, said outside means being adapted to separate gaseous products from the liquor; and
   (e) means for circulating a portion of said separated liquor back to said container.

2. The system as set forth in claim 1 including heat exchanger means for controlling the temperature of the electrolyte in said cell.

3. The system as set forth in claim 1 wherein the electrode space is between ⅛ inch and one inch.

4. The system as set forth in claim 1 including circulation means provided by combined and forced external pumping means and internal pumping action due to the construction and arrangement of the bipolar electrodes and the rising gaseous products of the electrolysis.

5. The electrolysis system of claim 1 wherein said means for circulating a portion of said separated liquor back to said cell includes: a closed loop system; and means for removing the remainder of said separated liquor from said closed loop system.

6. The system as set forth in claim 5 wherein said outside means for separating gaseous products from said liquor includes first means forming a primary separation unit, and second means forming a secondary separation unit.

7. An electrolytic cell comprising:
   (a) a container including a closure;
   (b) monopolar electrode means and bipolar electrode means positioned in the container and constructed and arranged to conduct electric current through the container and through electrolyte circulating in electrolyte channels between the electrode means;
   (c) main inlet means to said container for maintaining said container full of electrolyte;
   (d) means, positioned within said container, and providing an inlet flow distributor;
   (e) means providing flow from the inlet flow distributor to the electrolyte channels;
   (f) an individual non-electrolytic chamber superposed above each associated electrolyte channel;
   (g) recirculatory flow means within said container and spaced from the inlet flow distributor and interconnecting the non-electrolytic chamber and the inlet flow distributor;

(h) an outlet collector positioned within said container;

(i) a plurality of outlet channels, each interconnecting an associated one of the non-electrolytic chambers to the outlet collector; and (j) a main outlet from said container connected to the outlet collector.

8. The electrolytic cell of claim 7 wherein the bipolar electrode means comprises a stack of a plurality of electrode members, and the electrode members in each such stack are interconnected by divider means which are of T-shaped configuration, a portion of the T extending into a longitudinally extending slot in one of the vicinal electrode members.

9. The electrolytic cell of claim 7 wherein the bipolar electrode means comprises a stack of a plurality of electrode members, and the electrode members in the stack are permanently joined together by means of an electrically non-conductive adhesive.

10. The electrolytic cell of claim 7 wherein the bipolar electrode means comprises a stack of a plurality of electrode members, and the stack of electrode members is slidably retained between electrically non-conductive laterally disposed channel members.

11. The electrolytic cell of claim 7 wherein a plurality of such electrolyte channels is provided and arranged in seriatim side-by-side relationship within an enclosure.

12. The electrolytic cell of claim 7 wherein each said vertically extending lateral channel comunicates with its associated non-electrolytic chamber via a restricted aperture, the lateral channel also communicating via a restricted aperture, with an associated lower circulatory chamber, each said lower circulatory chamber being provided with a slotted outlet, each slotted outlet communicating with an associated one of the electrolyte channels.

13. The electrolytic cell of claim 7 wherein the outlet means comprises an upper, horizontally disposed, plate-like chamber, the chamber being connected, at its inlet, to the upper portions of each of such non-electrolytic chamber, and being connected, at its outlet, to an outlet header.

14. The electrolytic cell of claim 7 wherein each such non-electrolytic chamber includes a pair of spaced apart, electrically non-conductive divider plates, each such pair of plates providing a conduit communicating, at its lower portion, with the upper portion of an associated one of the electrolyte channels, and communicating, at its upper, remote portion, with an associated one of the outlet means.

15. The electrolytic cell of claim 7 wherein the means providing an inlet flow distributor is an inlet header, and the inlet header communicates with an upper horizontally disposed manifold which, in turn, communicates with a plurality of lateral, vertically disposed inlet conduits, each such conduit feeding an associated one of a plurality of circulatory chambers, each such circulatory chamber being connected to an associated one of said electrolyte channels.

16. The electrolytic cell of claim 15 including means for controlling the flow of the electrolyte channels and wherein each said lower circulatory chamber is provided with an outlet slot, such slot leading to an associated one of the electrolyte channels.

17. The electrolytic cell of claim 7 wherein the recirculatory flow means comprises a plurality of lateral, vertically disposed channels, each such channel interconnecting the upper and lower portions of an associated one of said electrolyte channels.

18. The electrolytic cell of claim 17 including a plurality of lower circulatory chambers, each connected to an associated one of the electrolyte channels and including a central recirculatory vertically disposed well to facilitate the recirculation.

19. A circulatory system of components for an electrolytic cell including at least two electrolyte channels, the system comprising:

(a) a vertically extending inlet conduit;

(b) means providing a restricted inlet between the inlet conduit and the electrolyte channels;

(c) a recirculatory conduit positioned to receive flow from each electrolyte channel for returning liquor to the electrolyte channel;

(d) means providing an inlet to each such recirculatory conduit and outlet from each such electrolyte channel;

(e) a divider plate superposed over each such electrolyte channel;

(f) a hollow collector superposed over the divider plate;

(g) means providing an inlet situated in a bottom surface of the collector;

(h) means providing an outlet situated in an upper surface of the collector;

(i) a pair of transversely extending plates, disposed one at each end of the divider plate; and (j) means forming a restricted outlet in one of the transversely extending plates;

wherein said restricted outlet is connected to said vertically extending inlet conduit for recirculation of electrolyte.

20. An electrolysis system comprising:

(1) an enclosed bipolar electrolytic cell provided with inlet means to maintain the cell full of electrolyte;

(2) common outlet means for withdrawing a mixture of effluent liquor and entrained gaseous products of electrolysis;

(3) means associated with the outlet means providing at least a partial separation of entrained gaseous products of electrolysis from the effluent liquor;

(4) vent means for the gases so separated;

(5) a reacting and degasifying chamber;

(6) means for conducting the effluent liquor to said reacting and degasifying chamber;

(7) gaseous vent means associated with the reacting and degasifying chamber;

(8) heat exchanger means;

(9) means for conducting effluent from the reacting and degasifying chamber which is to be recycled, to said heat exchanger means;

(10) a header tank and reacting chamber;

(11) means for conducting effluent from said heat exchanger means to said header tank and reacting chamber;

(12) means for conducting effluent from said header tank and reacting chamber together with fresh electrolyte to said enclosed bipolar electrolytic cell; and

(13) means for withdrawing a determined proportion of the effluent from the system.

21. The system as claimed in claim 20 including a branch line from the reacting and degasifying chamber to a filter; conduit means from said filter; and storage means for effluent from said filter.

References Cited

UNITED STATES PATENTS

| | | | |
|---|---|---|---|
| 1,023,545 | 4/1912 | Bates et al. | 204—95 |
| 1,414,059 | 4/1922 | Vorce | 204—95 |
| 1,837,519 | 12/1931 | Bleecker | 204—268 |
| 1,908,886 | 5/1933 | Brandt | 204—268 |
| 3,203,882 | 8/1965 | Forbes | 204—95 |
| 3,219,563 | 11/1965 | Collins et al. | 204—95 |
| 3,269,932 | 8/1966 | Worsham et al. | 204—270 |
| 3,298,946 | 1/1967 | Forbes | 204—268 |
| 3,316,167 | 4/1967 | Clarke et al. | 204—268 |

JOHN H. MACK, Primary Examiner

H. M. FLOURNOY, Assistant Examiner

U.S. Cl. X.R.

204—95